United States Patent
Kasamatsu

(10) Patent No.: US 7,694,028 B2
(45) Date of Patent: Apr. 6, 2010

(54) MULTI-FUNCTION DEVICE WITH MODEL INDENTIFICATION

(75) Inventor: Daisuke Kasamatsu, Aichi-ken (JP)

(73) Assignee: Brother Kogyo Kabushiki Kaisha, Nagoya, Aichi-ken (JP)

( * ) Notice: Subject to any disclaimer, the term of this patent is extended or adjusted under 35 U.S.C. 154(b) by 837 days.

(21) Appl. No.: 11/188,848

(22) Filed: Jul. 26, 2005

(65) Prior Publication Data

US 2006/0026306 A1   Feb. 2, 2006

(30) Foreign Application Priority Data

Jul. 27, 2004   (JP)   ............................. 2004-218757

(51) Int. Cl.
  G06F 3/00   (2006.01)
  G06F 12/00  (2006.01)
  G06F 13/00  (2006.01)
  G06F 13/28  (2006.01)
  G06F 3/12   (2006.01)
  G06F 15/00  (2006.01)
  H04N 1/21   (2006.01)
  H04N 1/23   (2006.01)
  H04N 1/00   (2006.01)

(52) U.S. Cl. .............................. 710/8; 710/10; 711/151; 711/164; 358/1.15; 358/296; 358/404; 358/1.1; 358/1.13; 358/1.14

(58) Field of Classification Search .................. 711/151, 711/152, 164; 358/296, 404, 1.1, 1.13–1.15; 710/10, 8

See application file for complete search history.

(56) References Cited

U.S. PATENT DOCUMENTS

| 5,610,725 | A | 3/1997 | Kawada et al. |
| 6,204,928 | B1 | 3/2001 | Nakai |
| 6,298,421 | B1 * | 10/2001 | Minamizawa et al. ....... 711/151 |
| 6,633,931 | B2 * | 10/2003 | Leung .......................... 710/62 |
| 2003/0044185 | A1 | 3/2003 | Kawaura |
| 2004/0153532 | A1 * | 8/2004 | Hosotani et al. ............. 709/222 |
| 2004/0207864 | A1 * | 10/2004 | Combs et al. .............. 358/1.13 |
| 2006/0070055 | A1 * | 3/2006 | Hodder et al. .............. 717/168 |

FOREIGN PATENT DOCUMENTS

| EP | 0 917 006 | 5/1999 |
| EP | 1 292 102 | 3/2003 |
| JP | 10311984 | 11/1998 |

* cited by examiner

Primary Examiner—Niketa I Patel
Assistant Examiner—Farley J Abad
(74) Attorney, Agent, or Firm—Banner & Witcoff, Ltd

(57) ABSTRACT

A multi function device includes a main board configured to control functions corresponding to a model of the multi function device and a sub board configured to be connected with the main board. The sub board carries out peripheral control corresponding to the model of the multi function device. Main board first identification information indicative of a category of the main board is obtained, and main board second identification information intrinsic to each model of the multi function device is also obtained. Then, the model of the multi function device is identified based on the main board first identification information and the main board second identification information when the multi function device is powered on. Further, function information corresponding to the identified model is obtained. The main board and the sub board of the multi function device are controlled based on the function information so as to function correctly.

13 Claims, 12 Drawing Sheets

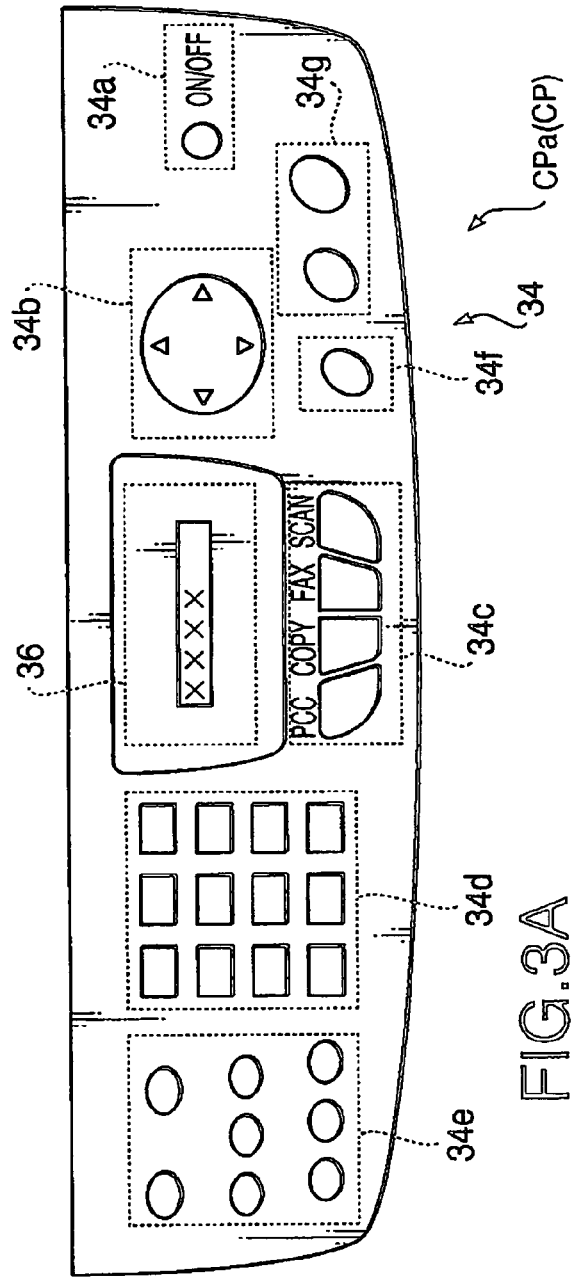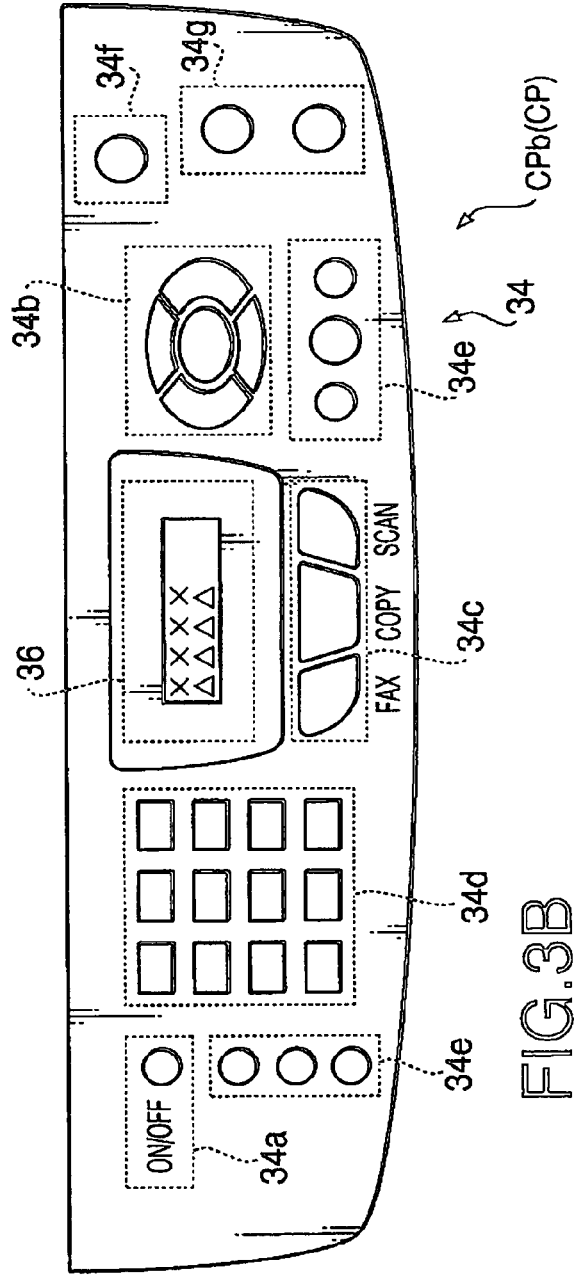
FIG.3A
FIG.3B

FIG.5A

| PORT | MAIN BOARD M1 | MAIN BOARD M2 | MAIN BOARD M3 | MAIN BOARD M4 |
|---|---|---|---|---|
| PORT A | OFF | ON | OFF | ON |
| PORT B | OFF | OFF | ON | ON |

FIG.5B

| AD CONVERTED VALUE | MAIN BOARD M1 | MAIN BOARD M2 | MAIN BOARD M3 | MAIN BOARD M4 |
|---|---|---|---|---|
| 0 – 22 | MODEL 1 | MODEL 17 | MODEL 33 | MODEL 49 |
| 23 – 69 | MODEL 2 | MODEL 18 | MODEL 34 | MODEL 50 |
| 6A – B0 | MODEL 3 | MODEL 19 | MODEL 35 | MODEL 51 |
| B1 – F4 | MODEL 4 | MODEL 20 | MODEL 36 | MODEL 52 |
| F5 – 135 | MODEL 5 | MODEL 21 | MODEL 37 | MODEL 53 |
| 136 – 177 | MODEL 6 | MODEL 22 | MODEL 38 | MODEL 54 |
| 178 – 1BA | MODEL 7 | MODEL 23 | MODEL 39 | MODEL 55 |
| 1BB – 200 | MODEL 8 | MODEL 24 | MODEL 40 | MODEL 56 |
| 201 – 245 | MODEL 9 | MODEL 25 | MODEL 41 | MODEL 57 |
| 246 – 288 | MODEL 10 | MODEL 26 | MODEL 42 | MODEL 58 |
| 289 – 2CA | MODEL 11 | MODEL 27 | MODEL 43 | MODEL 59 |
| 2CB – 30B | MODEL 12 | MODEL 28 | MODEL 44 | MODEL 60 |
| 30C – 34F | MODEL 13 | MODEL 29 | MODEL 45 | MODEL 61 |
| 350 – 396 | MODEL 14 | MODEL 30 | MODEL 46 | MODEL 62 |
| 397 – 3DD | MODEL 15 | MODEL 31 | MODEL 47 | MODEL 63 |
| 3DE – 3FF | MODEL 16 | MODEL 32 | MODEL 48 | MODEL 64 |

FIG.5C

| MFD MODEL | MAIN MODEL | PANEL |
|---|---|---|
| MODEL 1 | MAIN BOARD M1 | PANEL 1 |
| MODEL 2 | MAIN BOARD M1 | PANEL 17 |
| MODEL 3 | MAIN BOARD M1 | PANEL 33 |
| MODEL 4 | MAIN BOARD M1 | PANEL 49 |
| MODEL 5 | MAIN BOARD M1 | PANEL 2 |
| MODEL 6 | MAIN BOARD M1 | PANEL 18 |
| MODEL 7 | MAIN BOARD M1 | PANEL 34 |
| MODEL 8 | MAIN BOARD M1 | PANEL 51 |
| MODEL 9 | MAIN BOARD M1 | PANEL 3 |
| MODEL 10 | MAIN BOARD M1 | PANEL 19 |
| MODEL 11 | MAIN BOARD M1 | PANEL 35 |
| MODEL 12 | MAIN BOARD M1 | PANEL 50 |
| MODEL 13 | MAIN BOARD M1 | PANEL 4 |
| MODEL 14 | MAIN BOARD M1 | PANEL 20 |
| MODEL 15 | MAIN BOARD M1 | PANEL 36 |
| MODEL 16 | MAIN BOARD M1 | PANEL 52 |

FIG.6A

| PORT | PANEL BOARD P1 | PANEL BOARD P2 | PANEL BOARD P3 | PANEL BOARD P4 |
|---|---|---|---|---|
| PORT C | OFF | ON | OFF | ON |
| PORT D | OFF | OFF | ON | ON |

FIG.6B

| AD CONVERTED VALUE | PANEL BOARD P1 | PANEL BOARD P2 | PANEL BOARD P3 | PANEL BOARD P4 |
|---|---|---|---|---|
| 0 – 22 | PANEL 1 | PANEL 17 | PANEL 33 | PANEL 49 |
| 23 – 69 | PANEL 2 | PANEL 18 | PANEL 34 | PANEL 50 |
| 6A – B0 | PANEL 3 | PANEL 19 | PANEL 35 | PANEL 51 |
| B1 – F4 | PANEL 4 | PANEL 20 | PANEL 36 | PANEL 52 |
| F5 – 135 | PANEL 5 | PANEL 21 | PANEL 37 | PANEL 53 |
| 136 – 177 | PANEL 6 | PANEL 22 | PANEL 38 | PANEL 54 |
| 178 – 1BA | PANEL 7 | PANEL 23 | PANEL 39 | PANEL 55 |
| 1BB – 200 | PANEL 8 | PANEL 24 | PANEL 40 | PANEL 56 |
| 201 – 245 | PANEL 9 | PANEL 25 | PANEL 41 | PANEL 57 |
| 246 – 288 | PANEL 10 | PANEL 26 | PANEL 42 | PANEL 58 |
| 289 – 2CA | PANEL 11 | PANEL 27 | PANEL 43 | PANEL 59 |
| 2CB – 30B | PANEL 12 | PANEL 28 | PANEL 44 | PANEL 60 |
| 30C – 34F | PANEL 13 | PANEL 29 | PANEL 45 | PANEL 61 |
| 350 – 396 | PANEL 14 | PANEL 30 | PANEL 46 | PANEL 62 |
| 397 – 3DD | PANEL 15 | PANEL 31 | PANEL 47 | PANEL 63 |
| 3DE – 3FF | PANEL 16 | PANEL 32 | PANEL 48 | PANEL 64 |

US 7,694,028 B2

MULTI-FUNCTION DEVICE WITH MODEL INDENTIFICATION

CROSS REFERENCE TO RELATED APPLICATIONS

This application claims priority from Japanese Patent Application No. 2004-218757, filed on Jul. 27, 2004. The entire subject matter of the priority application is incorporated herein by reference.

BACKGROUND

1. Technical Field

Aspects of the invention relate to a multi function device (MFD), particularly to the MFD that is configured such that an appropriate setting for a combination of a main board and a panel board can be automatically made without input from a user.

2. Related Art

Multi function devices (MFD) having a plurality of functions such as a function of a facsimile device are known. Due to recent customer demands for increased number of functions, a variety of models from low-grade models to high-grade models have been produced. In such variety of models, operation panels corresponding to the grade of the models are provided, respectively. The operation panel in each MFD is controlled by a panel board, which is connected to and controlled by a main board.

If, in one model, a combination of the main board and the panel board is inappropriate, the operation panel may not function correctly. In the worst case, the operation panel may not work at all. In Japanese Patent Provisional Publication No. HEI 10-311984, a configuration enabling a correct implementation of various operation panels is disclosed. The configuration according to the publication (i.e., HEI 10-311984), in order to ensure an appropriate combination of an LCD (Liquid Crystal Display) and a connecting board that connects the LCD and an LCD driving circuit, a position adjusting mark that indicates a model of the LCD device, which consists of the LCD panel, LCD driving circuit and the connecting board, is provided. By use of the mark, the user visually recognizes the model, thereby suppressing production of defective products due to incorporation of panels for different models.

On the other hand, in many cases, a variety of models of the MFDs are designed to be controlled by the same control program in order to reduce manufacturing costs. In order to ensure the common program can be used to drive the variety of models, it is necessary that the common program identifies a model of the panel board connected to the main board. Conventionally, as will be described with reference to FIG. 12, the correspondence between the main board and the panel board is manually input by the operator.

FIG. 12 shows a flowchart illustrating a conventionally employed procedure of inputting a setting regarding a combination of the main board and panel board of the MFD. The procedure shown in FIG. 12 is executed when the MFD is powered ON. In S101, the process judges whether an operation mode of the MFD has been set to a maintenance mode. If the process determines that the operation mode is set to the maintenance mode (S101: YES), the process writes a model information input by the user (i.e., information representing the model of the MFD) in an EEPROM (Electrically Erasable Programmable Read Only Memory) built in the MFD. With this operation, since the model information is stored in the EEPROM, if the MFD is powered ON next time, and the operation mode is not set to the maintenance mode (S101: NO), the process retrieves the stored model information from the EEPROM (S103). Then, in S104, the process identifies the model of the operation panel based on the retrieved model information, and sets a key-matrix corresponding to the identified model of the operation panel. After the setting of the key-matrix in S104, the process proceeds to a standby mode. As a result of steps S103 and S104, operations of the operation panel are interpreted correctly, which correspond to the model of the operation panel, and thus the MFD operates correctly.

The model information manually input by the user is typically a numeral code consisting of a plurality of digits (e.g., four digits) of numbers. To input such a numeral code for each MFD is very troublesome. Further, since the numeral code is input by the user, there occurs an input error, which results in defective products. However, as far as the numeral code is input manually, there remains a possibility of an erroneous input.

SUMMARY

Aspects of the present invention provide an improved MFD in which settings regarding a proper combination of the main board and the panel board can be made without requiring data input by a user.

BRIEF DESCRIPTION OF THE ACCOMPANYING DRAWINGS

FIGS. 3A and 3B are plan views of two types of operation panels of MFDs in accordance with aspects of the present invention.

Figure 4:
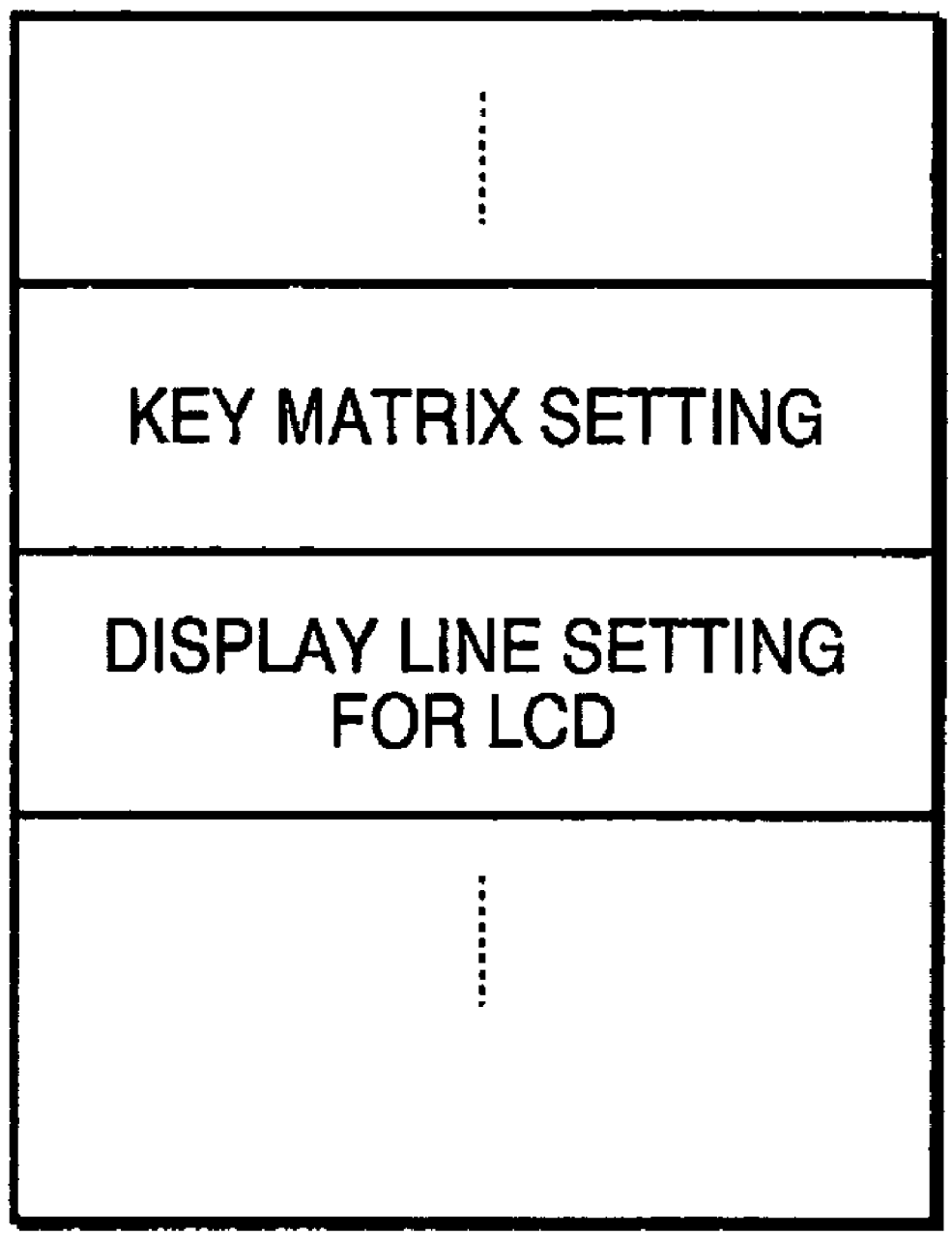

FIG. 4 schematically shows a structure of a function table stored in a function table memory in accordance with aspects of the present invention.

FIG. 5A is a table indicating a relationship between four categories of the main board and outputs from a main board category identifying circuit in accordance with aspects of the present invention.

FIG. 5B is a table indicating a relationship among the four categories of the main board, AD converted values of voltages output by a model identifying circuit and models of the MFD in accordance with aspects of the present invention.

FIG. 5C is a table indicating combinations of a main board and operation panels in accordance with aspects of the present invention.

FIG. 6A shows a table indicating a relationship between the four categories of the main board and outputs of the panel board category identifying circuit in accordance with aspects of the present invention.

FIG. 6B is a table indicating a relationship among the four categories of the panel board, AD converted values of the outputs of the panel identifying circuit and operation panels in accordance with aspects of the present invention.

Figure 7:
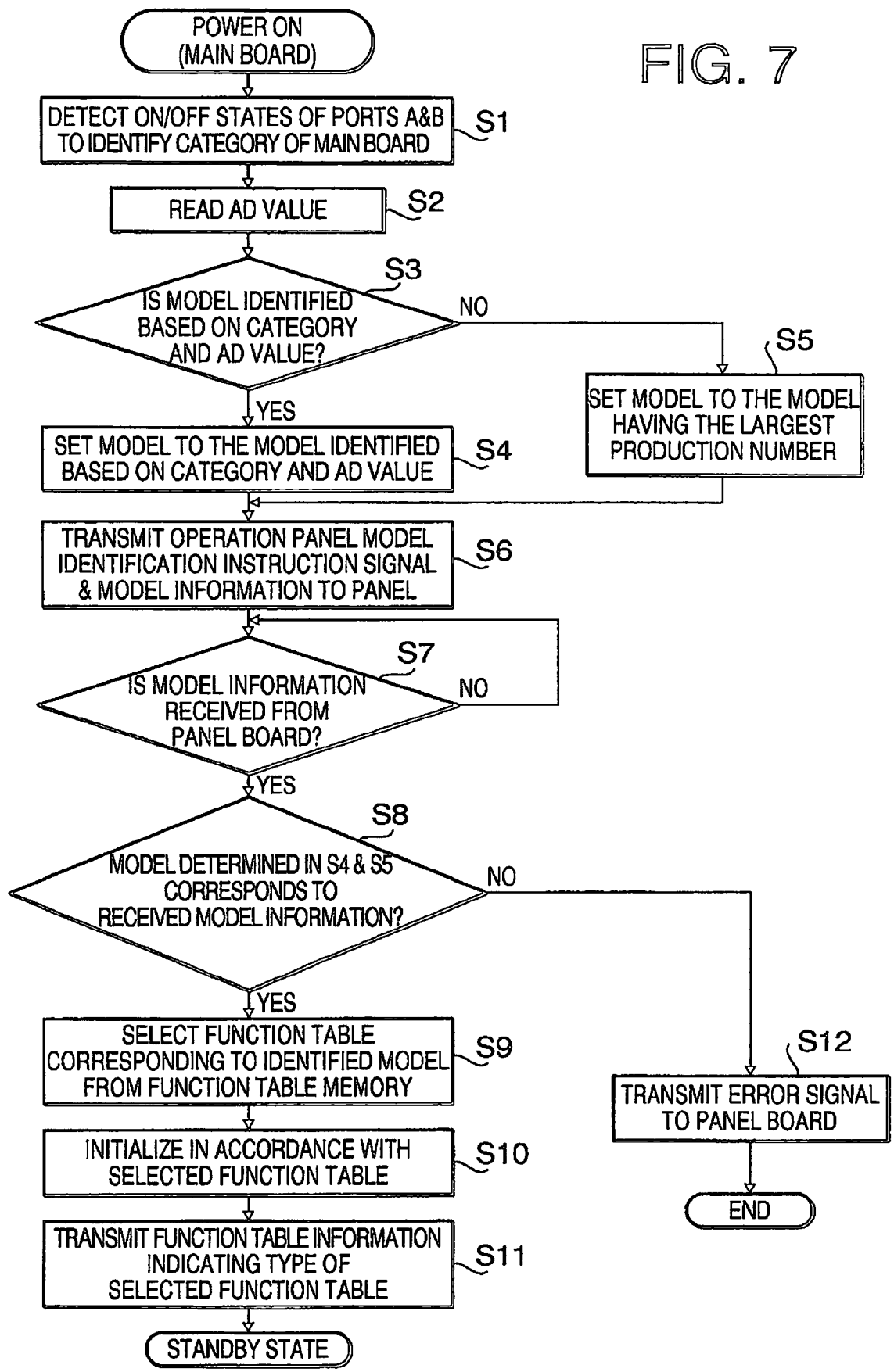

FIG. 7 shows a flowchart illustrating a main procedure executed by the main board according to a first embodiment of the invention in accordance with aspects of the present invention.

Figure 8:
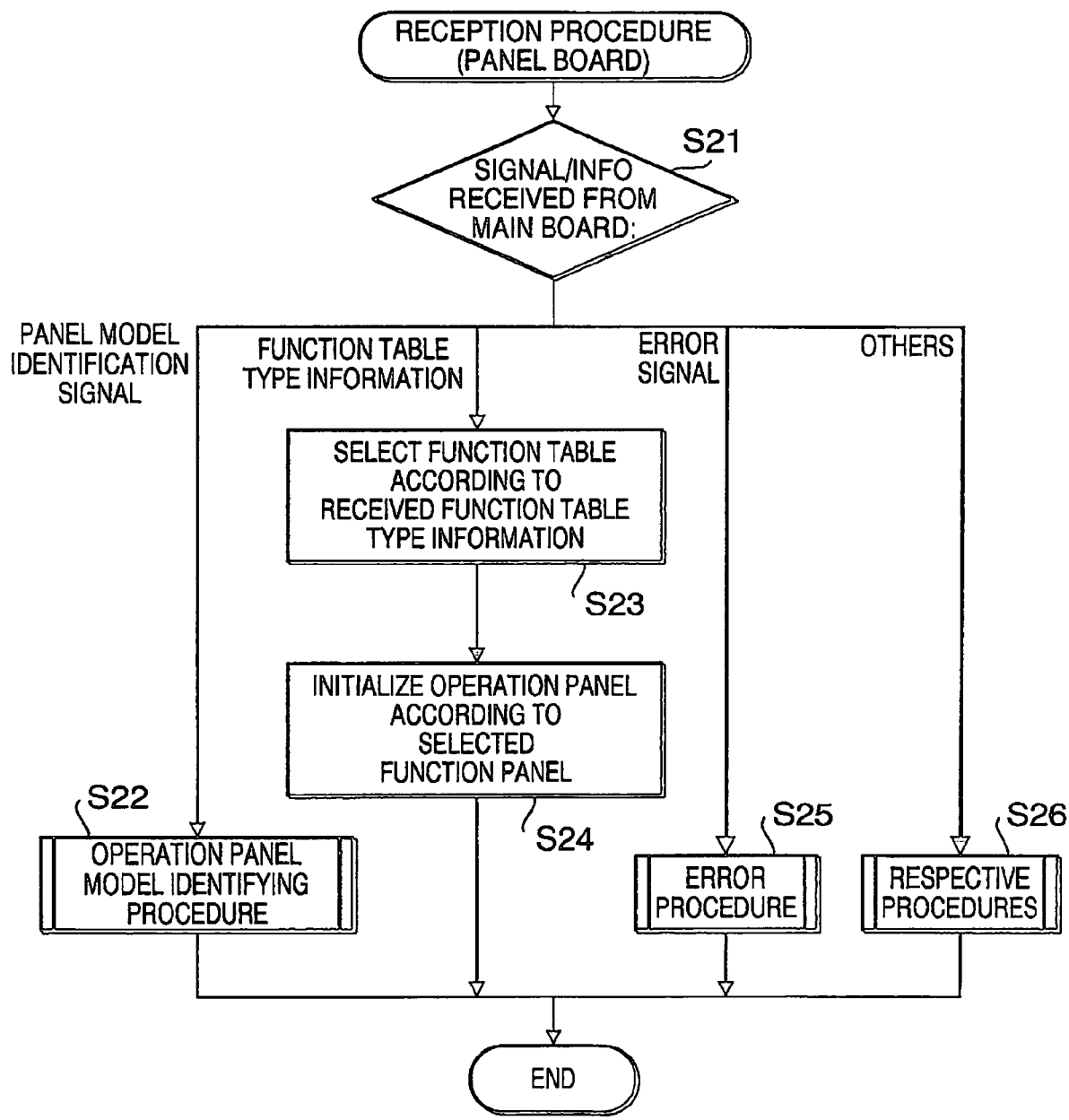

FIG. 8 shows a flowchart illustrating a receiving procedure executed by a panel board in accordance with aspects of the present invention.

Figure 9:
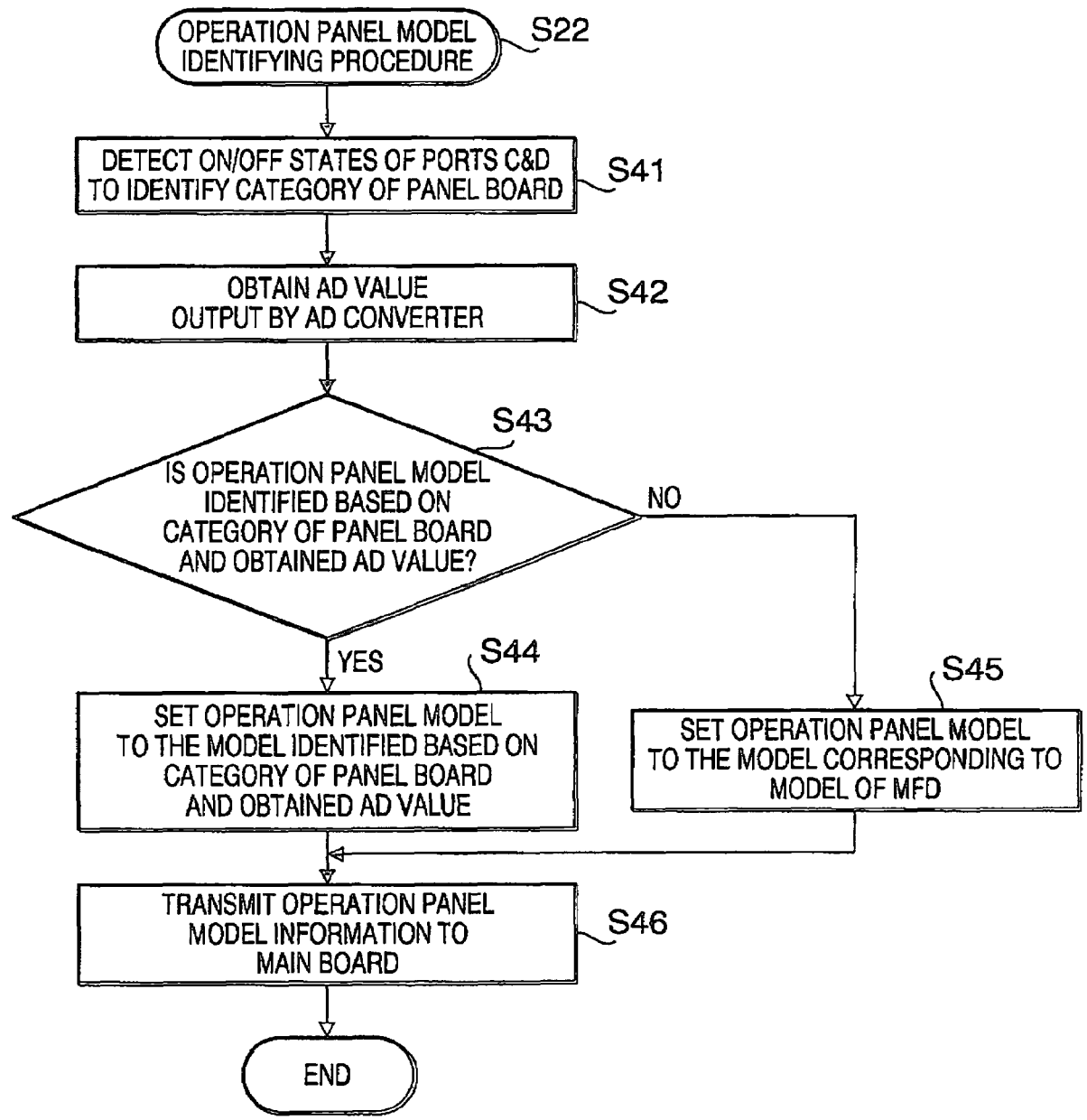

FIG. 9 shows a flowchart illustrating a panel model identifying procedure executed by the panel board according to the first embodiment.

Figure 10:
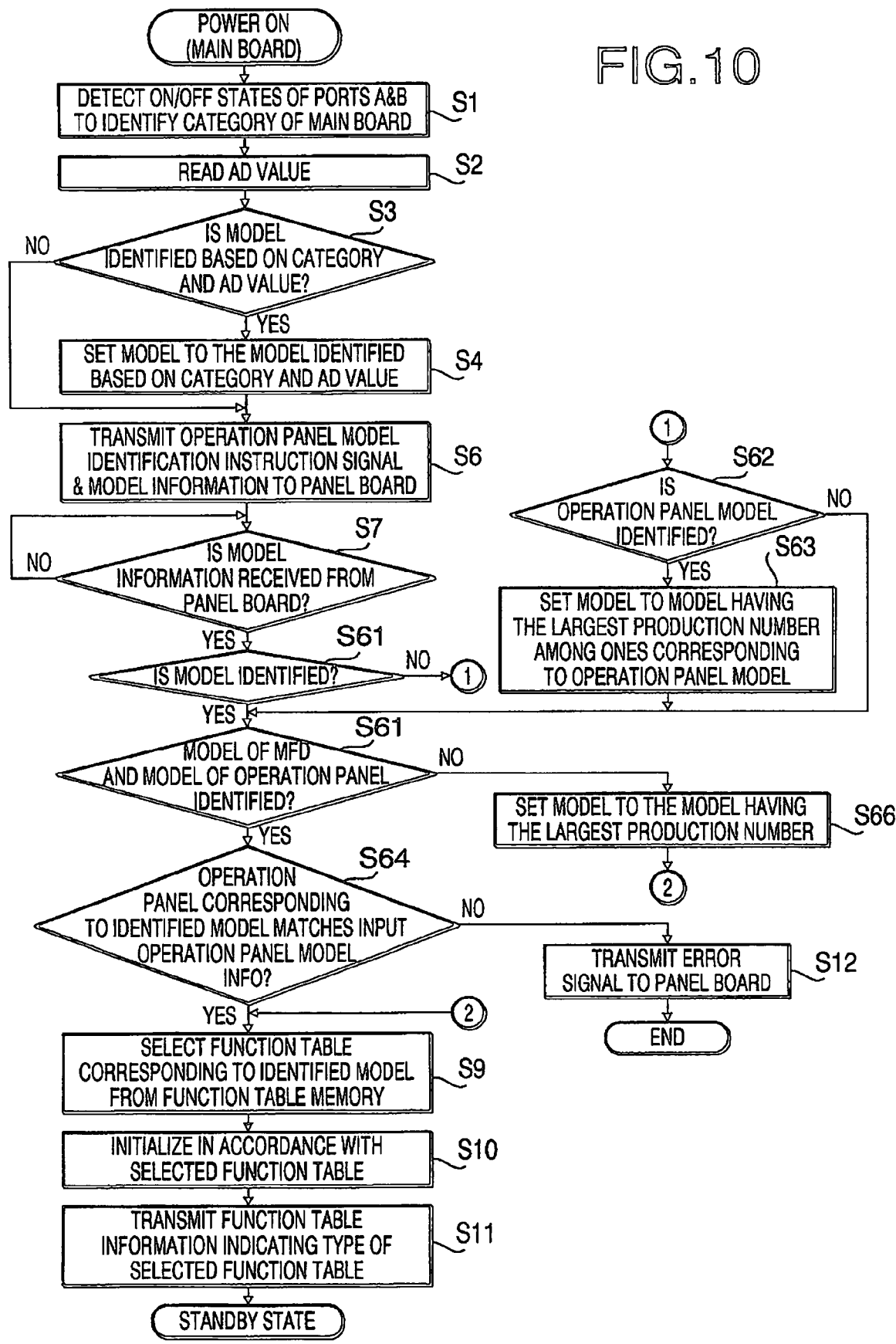

FIG. 10 shows a flowchart illustrating a main procedure executed by the main board, according to a second embodiment.

Figure 11:
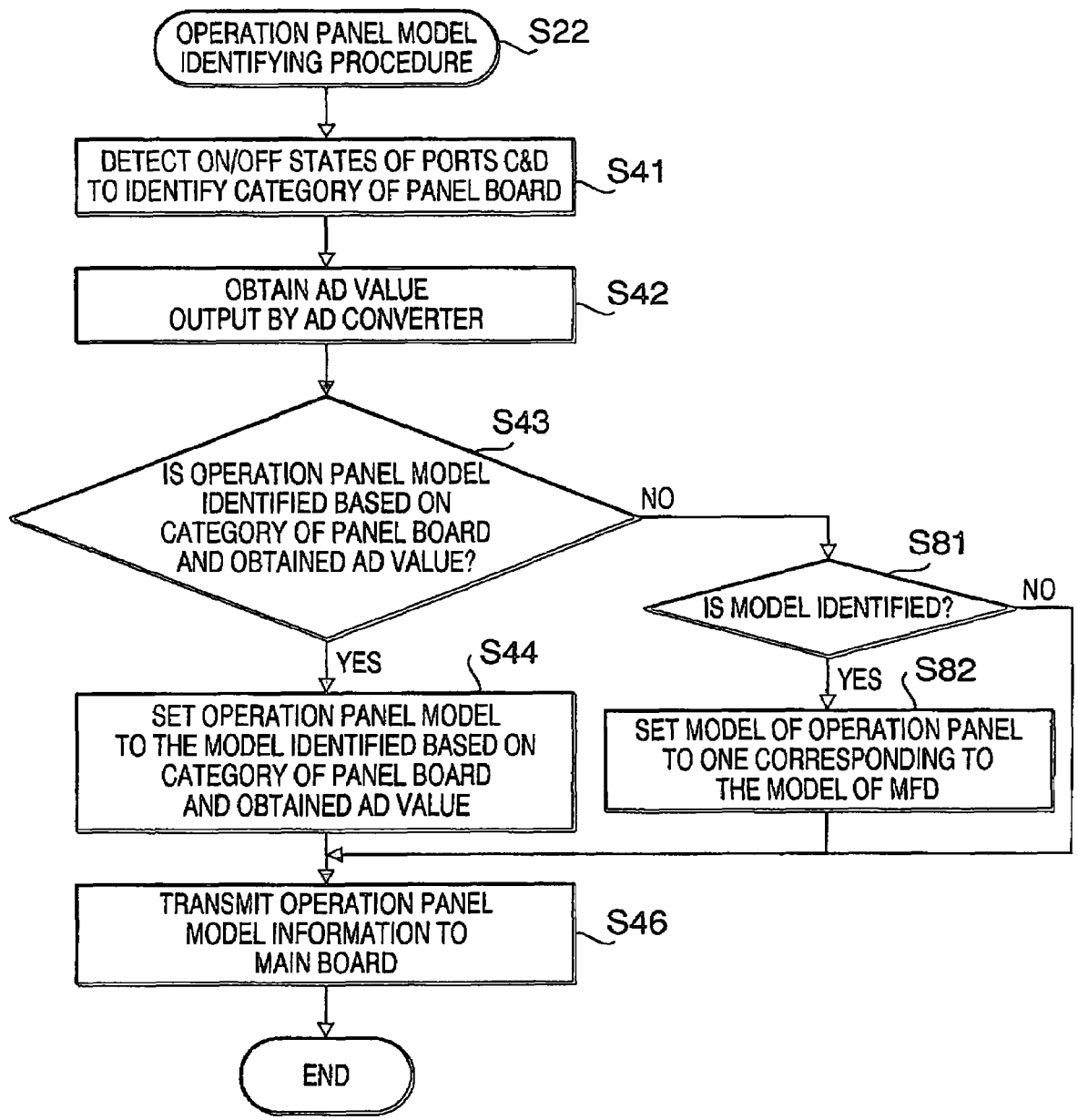

FIG. 11 shows a flowchart illustrating a panel model identifying procedure executed by the panel board according to the second embodiment.

Figure 12:
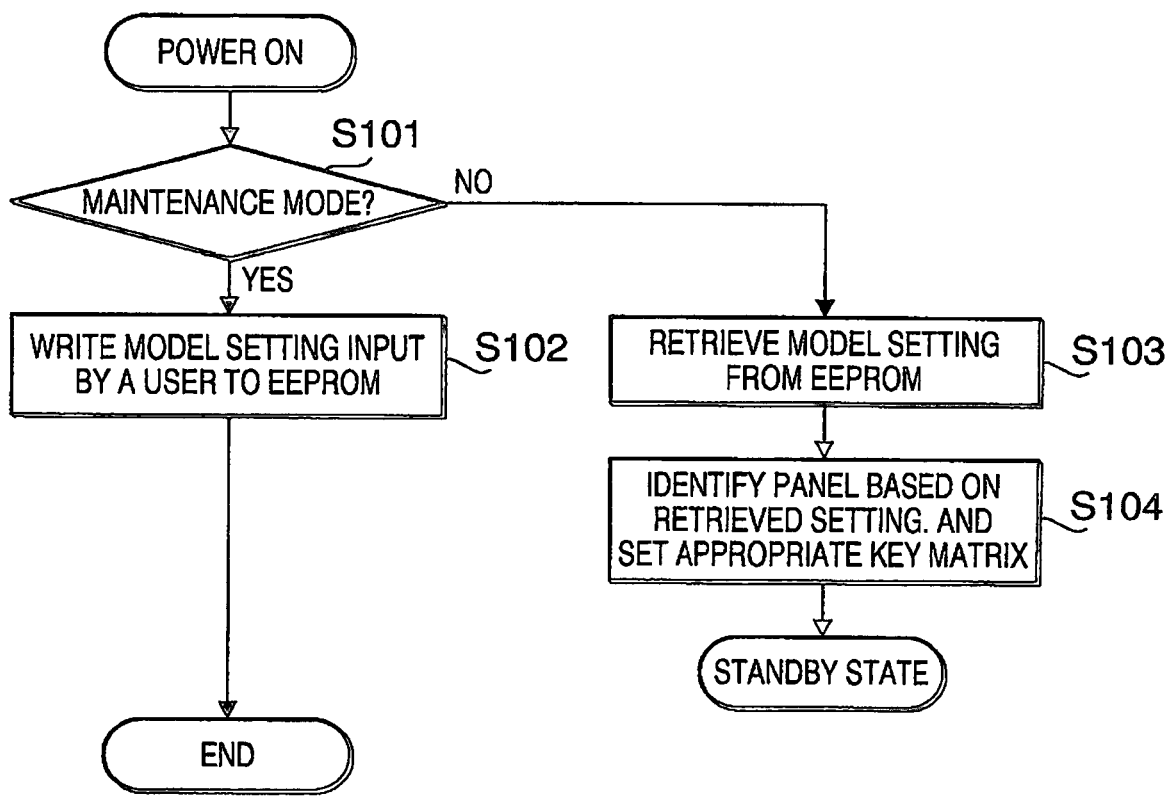

FIG. 12 shows a flowchart illustrating a setting procedure in which a correspondence between the main board and the panel board is manually set, according to a conventional MFD.

DETAILED DESCRIPTION

General Overview of Aspects of the Invention

According to an aspect of the invention, there is provide a multi function device, which is provided with a main board configured to control functions corresponding to a model of the multi function device, a sub board configured to be connected with the main board, the sub board carrying out peripheral control corresponding to the model of the multi function device, a function information storage configured to store function information enabling a combination of the main board and sub board corresponding to the model of the multi function device to function appropriately for each model of the multi function device, a main board first identification information obtaining system that obtains main board first identification information indicative of a category of the main board, a main board second identification information obtaining system that obtains main board second identification information which the main board peculiarly includes for each model of the multi function device, a model identifying system configured to identify the model of the multi function device based on the main board first identification information obtained by the main board first identification information obtaining system and the main board second identification information obtained by the main board second information obtaining system when the multi function device is powered on, a function information obtaining system that obtains function information corresponding to the model identified by the model identifying system, and a function control system that controls the main board and the sub board of the identified model of the multi function device to correctly function based on the function information obtained by the function information obtaining system.

It is noted that various connections are set forth between elements in the following description. It is noted that these connections in general and unless specified otherwise, may be direct or indirect and that this specification is not intended to be limiting in the respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

The MFD configured above may include the main board that mainly controls functions corresponding to the model of the MFD, and the sub board, which is connected to the main board and operates in accordance with instructions transmitted from the main board, may carry out peripheral control. The function information enabling the combination of the main board and sub board, which combination is determined for each model of the MFD, to function appropriately is stored in the function information storing system.

When the MFD is powered ON, the model of the MFD is identified based on the main board first identification information and the main board second identification information. Then, the model information corresponding to the thus identified model is obtained from the function information storing system by the function information obtaining system.

Based on the thus obtained function information for the model, the main board and the sub board are controlled to operate normally.

As above, without relying on a user, a relationship between the main board and the sub board can be identified based on the category of the main board and the information intrinsic to the sub board. As a result, necessary settings can be automatically carried out and the main board and the sub board function normally. Since the correspondence between the main board and the sub board can be made automatically, troublesome work therefor, which has been required in conventional devices, can be avoided. Further, since the setting is carried out automatically, occurrence of an error due to mistakes of the user can also be avoided. Furthermore, the model of the MFD is identified based on the combination of the main board first identification information and the main board second identification information, the number of distinguishable models may increase, and a variety of models can be identified accurately despite the high number of models.

The main board may include a model identifying circuit configured to output a voltage intrinsic to the model, and a main board voltage reading system that reads an AD converted value of the voltage output by the model identifying circuit. The main board second identification information obtained by the main board second identification information obtaining system may be the AD converted value of the voltage read by the main board voltage reading system.

According to the above configuration, as the second identification information intrinsic to the main board for each model of the MFD, the AD converted value of the voltage output by the model identifying circuit is referred to. Thus, the model can be identified based on a hardware configuration, that is, the correspondence between the main board and the sub board can be made based on the hardware configuration. Therefore, a troublesome work such as the user's input of data can be avoided, and accordingly, malfunctions due to erroneous input of the user can be avoided. Further, since the AD converted value is used, the output voltage of the model identifying circuit can be detected at a high resolution. As a result, identification of the model can be realized at the high resolution.

For each sub device which is controlled by the sub board, provided area a sub board first identification information obtaining system configured to obtain sub board first identification information the sub board peculiarly includes, a sub device identification system configured to identify the sub device based on the sub board first identification information obtained by the sub board first identification information obtaining system when the multi function device is powered on, a coincidence judging system configured to judge whether the sub device identified by the sub device identifying system coincides with the sub device of the identified model of the multi function device identified by the model identifying system. The function information obtaining system may obtain the function information corresponding to the model identified by the model identifying system from the function information storing system if the coincidence judging system determines that the sub device identified by the sub device identifying system coincides with the sub device of the identified model of the multi function device identified by the model identifying system.

According to the above configuration, when the MFD is powered ON, the sub device is identified based on the sub board first identification information. Then, it is judges whether the thus identified sub device coincides with the sub device to be used in the model identified by the model identifying system. If they coincide with each other, the function information corresponding to the identified model is obtained from the function information storing system. Then, the main board and the sub board are controlled to operate normally. Since it is judged whether the model identified based on the information from the main board is correct or not by identifying the sub device based on the information obtained from the sub board, the relationship between the main board and the sub board may be examined accurately. As a result, malfunctions due to inappropriate combination of the main board and the sub board can be suppressed effectively.

The sub board may include a sub device identifying circuit configured to output a voltage intrinsic to the sub device controlled by the sub board, and a sub board voltage reading system configured to read an AD converted value of the voltage output by the sub device identifying circuit. The sub board first identification information obtained by the sub board first identification information obtaining system may include the AD converted value of the voltage read by the sub board voltage reading system.

According to the above configuration, as the sub board first identification information intrinsic to the sub board, the AD converted value of the voltage output by the sub device identifying circuit which outputs the voltage intrinsic to the sub device controlled by the sub board. Therefore, the sub device can be identified based on the hardware configuration, and thus whether the model identified based on the information obtained from the main board is correct is judged automatically. Thus, the malfunction of the MFD due to human errors can be avoided. Further, since the AD value is used as the sub board first identification information, the identification information can be obtained at a high resolution. Consequently, the identification of the sub device can be done at a high accuracy.

The multi function system may further include a sub board second identification information obtaining system that obtains sub board second identification information that identifies a category of the sub board. The sub device identifying system may identify a sub device based on the sub board first identification information obtained by the sub board first identification information obtaining system and the sub board second identification information obtained by the sub board second identification information obtaining system when the multi function device is powered on.

According to the above configuration, when the MFD is powered ON, the sub device is identified based on the sub board first identification information and the sub board second identification information. Since the sub device is identified based on the combination of the sub board first identification information and the sub board second identification information, the number of distinguishable sub devices increase, and even if the variety of sub devices should be identified, it can be done at high accuracy.

The multi function device may further include an error notifying system configured to notify an occurrence of an error when the sub device identified by the sub device identifying system and the sub device of the model identified by the model identifying system are determined to be different by the coincidence judging system.

According to the above configuration, when the error is notified, the user can recognize that the MFD is not operating correctly. Therefore, the user can redo the correlation between the main board and the sub board, or as the manufacture to fix the MFD immediately.

The sub device may include a substitute model storing system configured to store a substitute model which is used as the model identified by the model identifying system if the sub device is identified by the sub device identifying system, if the model cannot be identified based on the model identification information, and a model substituting system that uses the model stored in the substitution model storing system as the model identified by the model identification system if the model cannot be identified based on the model identification information when the sub device is identified by the sub device identifying system.

According to the above configuration, when the sub device has been identified by the model cannot be identified by the model identifying system, the substitute model stored in the substituted model storing system is used as the model identified by the model identifying system. The substitute model may be the model having the largest production number among the models corresponding to the identified sub device. In such a case, a possibility that the basic function of the MFD does not work can be reduced. If the basic function is available, the resetting operation can be carried out relatively easily.

The multi function device may further include a substitute model storing system that stores a substitute model, which is used as the model identified by the model identifying system if the model cannot be identified by the model identifying system, and a substituting system that substitute the substitute model stored in the substitute model storing system as the model identified by the model identifying system if the model cannot be identified by the model identifying system.

According to the above configuration, if the model of the MFD cannot be identified by the model identifying system, the substitute model stored in the substituted model storing system may be used as the model identified by the mole identifying system. The substitute model may be the model of the MFD having the largest production number. In such a case, a possibility that the basic function of the MFD does not work can be reduced. If the basic function is available, the resetting operation can be carried out relatively easily.

The main board may include a model identifying circuit configured to output a voltage intrinsic to the model, and a main board voltage reading system that reads an AD converted value of the voltage output by the model identifying circuit. The main board second identification information obtained by the main board second identification information obtaining system may be the AD converted value of the voltage read by the main board voltage reading system. The substitute model stored in the substitute model storing system may be a model having the largest production number. If the model identifying system cannot identify the model as the AD converted value obtained by the main board second identification information obtaining system is indefinite, the substituting system may use the model having the largest production number as the model identified by the model identifying system.

According to the above configuration, as the main board second identification information, the AD converted value of the voltage output by the model identifying circuit is used. If the AD converted value is indefinite and the model identifying system cannot identify the model, the substitute model, which has the model having the largest production number, may be used as the model identified by the model identifying system.

Therefore, even if the model cannot be identified as the AD converted value of the voltage is indefinite, by use of the model having the largest production number, a possibility that the basic function does not work can be reduced. If the basic function is available, the resetting operation can be carried out relatively easily.

The sub device may be an operation panel through which operations corresponding to the model can be instructed, and the function information may include information regarding settings of the operation panel.

According to the above configuration, the function information enabling the combination of the main board and the sub board to function normally may include the setting of the operation panel for inputting instructions corresponding to the model. Since the setting of the operation panel, which may be different among models, can be automatically set by the main board, malfunctions due to setting errors by a user can be avoided.

The sub device may be an operation panel including at least one of a displaying unit configured to display an indication corresponding to the model and a notifying unit configured to output notification corresponding to the model, and the function information may include setting information of the at least one of the displaying unit and the notifying unit.

According to the above configuration, the function information enabling the combination of the main board and the sub board to function normally may include the setting of the displaying unit and/or notifying unit. Since the setting of the operation panel, which may be different among models, can be automatically set by the main board, malfunctions of the display unit/notifying unit due to setting errors by a user can be avoided.

According to another aspect of the invention, there is provided a method of carrying out function setting for a multi function device including a main board configured to control functions corresponding to a model of the multi function device and a sub board configured to be connected with the main board, the sub board carrying out peripheral control corresponding to the model of the multi function device. The method may include the steps of obtaining main board first identification information indicative of a category of the main board, obtaining main board second identification information intrinsic to each model of the multi function device, identifying the model of the multi function device based on the main board first identification information and the main board second identification information when the multi function device is powered on, obtaining function information corresponding to the identified model, and controlling the main board and the sub board of the multi function device to correctly function based on the function information.

According to a further aspect of the invention, there is provided a computer program product comprising computer readable instructions which cause a computer to carry out function setting for a multi function device including a main board configured to control functions corresponding to a model of the multi function device and a sub board configured to be connected with the main board, the sub board carrying out peripheral control corresponding to the model of the multi function device. The instructions may cause the computer to obtain main board first identification information indicative of a category of the main board, to obtain main board second identification information intrinsic to each model of the multi function device, to identify the model of the multi function device based on the main board first identification information and the main board second identification information when the multi function device is powered on, to obtain function information corresponding to the identified model, and to control the main board and the sub board of the multi function device to correctly function based on the function information.

First Embodiment

Referring to the accompanying drawings, illustrative embodiments of aspects of the invention will be described in detail.

Figure 1:
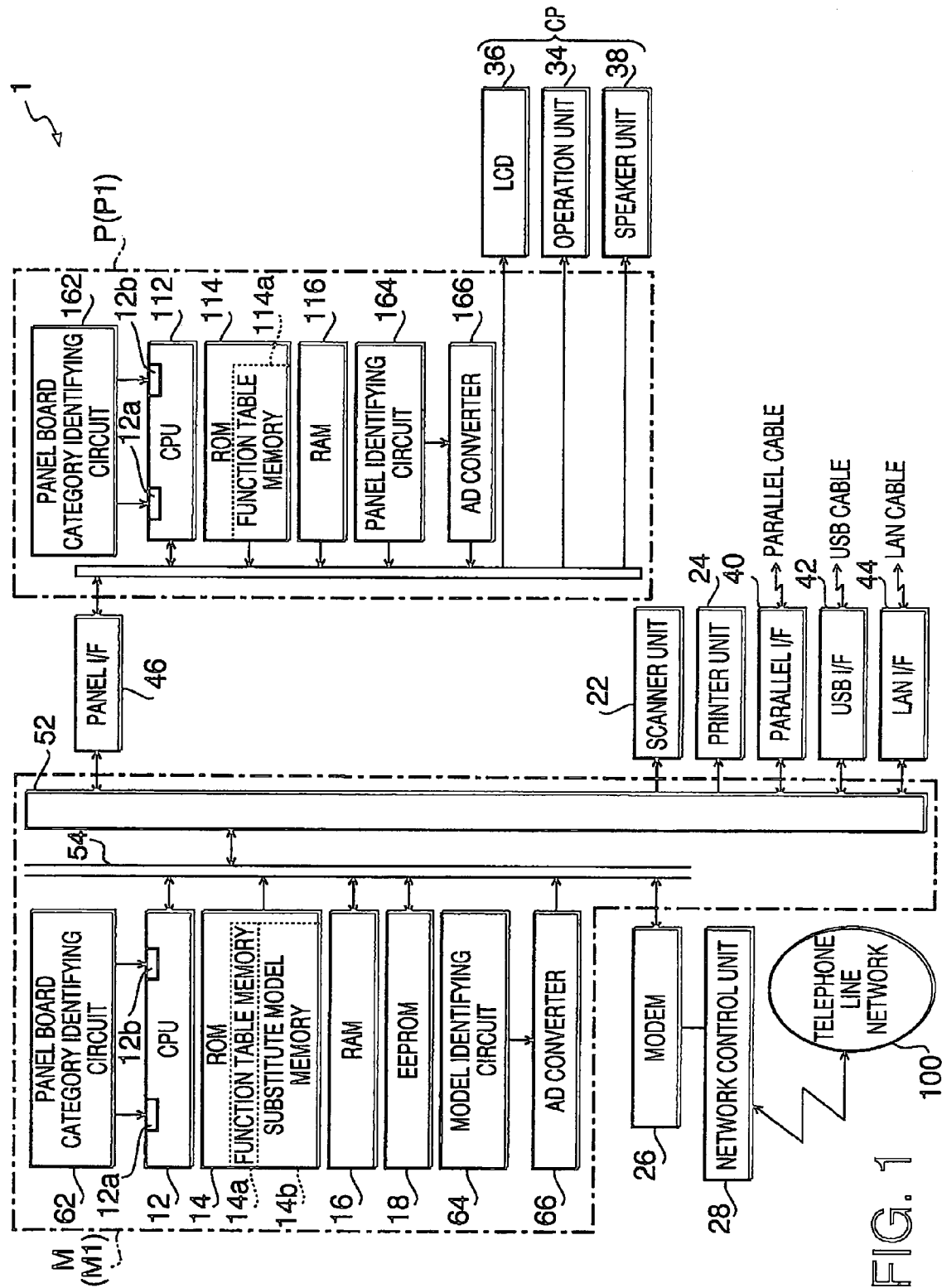
FIG. 1 is a block diagram showing a configuration of a control system of an MFD according to a first embodiment of the invention, in which a main board falls in a first category.
Figure 2:
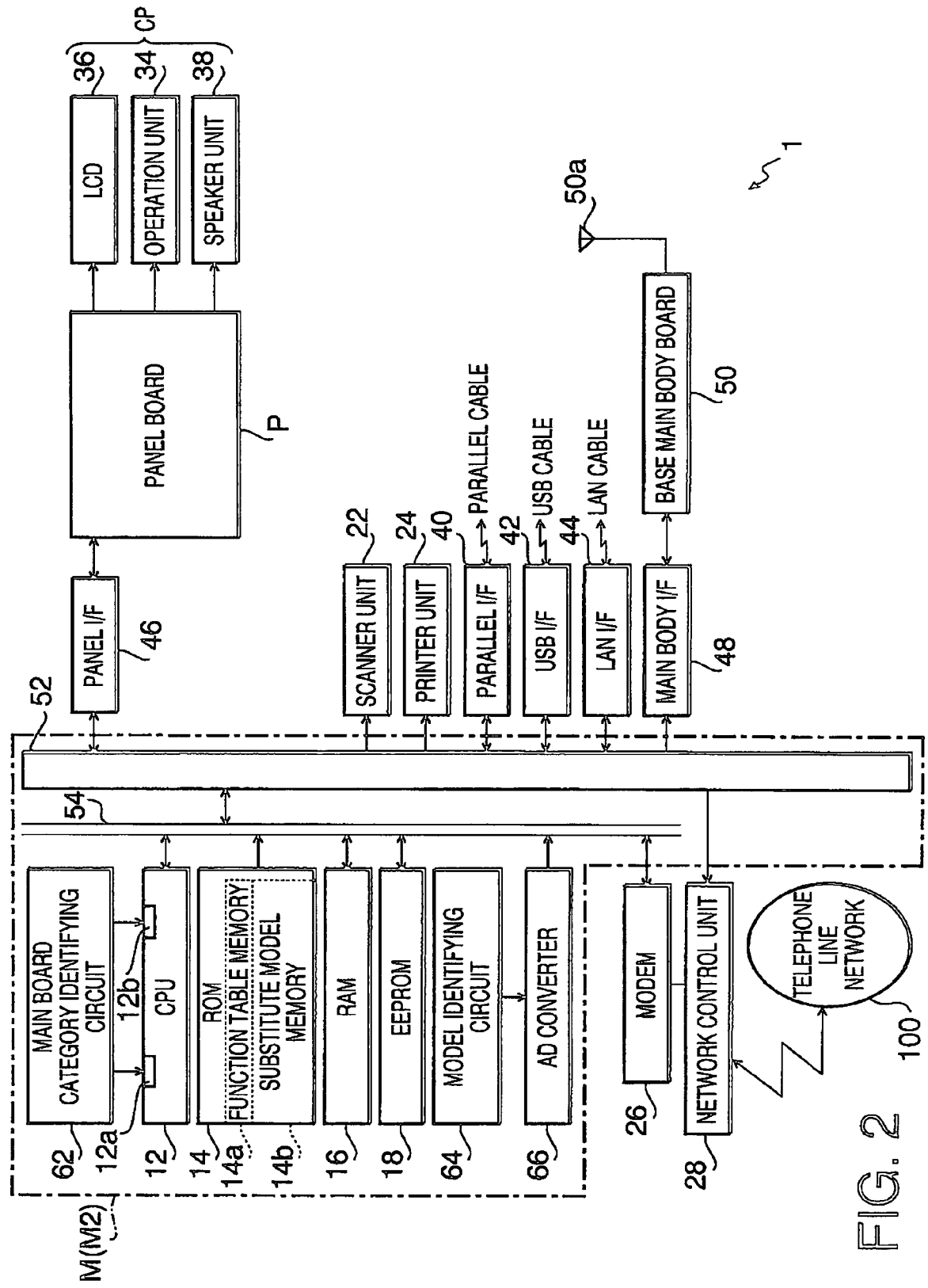
FIG. 2 is a block diagram showing a configuration of another control system of an MFD, in which a main board falls in a second category in accordance with aspects of the invention.

Firstly, referring to FIGS. 1 and 2, a configuration of an MFD (Multi Function Device) 1 according to a first embodiment of the invention will be described. FIGS. 1 and 2 are block diagrams of the MFDs according to the first embodiment. Specifically, FIG. 1 shows a block diagram of an electrical configuration, in which a main board M1 is employed as a main board M, while FIG. 2 shows a block diagram of an electrical configuration in which a main board M2 is used as the main board.

The MFD is configured such that a plurality of functions (including a facsimile function, a voice communication function using a telephone line 100, and a printer function) are implemented in a single device.

As shown in FIG. 1, the MFD 1 includes a main board M (M1), a panel board P (P1), a scanner unit 22, a printer unit 24, a modem 26, a line control unit 28, a parallel interface (I/F) 40, a USB (Universal Serial Bus) I/F 42, a LAN (Local Area Network) I/F 44, a panel I/F 46, an operation unit 34, an LCD 36 and a speaker unit 38. An operation panel CP is provided with the operation unit 34, the LCD 36 and the speaker unit 38.

The main board M is a board that functions to control entire operation of the MFD 1. There are a plurality of models of main boards M corresponding to models of the MFD 1 (e.g., a general-purpose model having a basic function, a model for a cordless operation, etc.). As examples of such models of the main board M, FIG. 1 shows the main board M1, and FIG. 2 shows a main board M2.

As shown in FIG. 1, the main board M (main board M1) is provided with a CPU (Central Processing Unit) 12 that controls the entire operation of the MFD 1, a ROM (Read Only Memory) 14 that stores various control programs to be executed by the CPU 12 and fixed value data, a RAM (Random Access Memory) 16 that temporarily stores data and programs necessary for various operations, an EEPROM 18 is a non-volatile memory that stores various pieces of data and setting parameters set by the user, a main board category identifying circuit 62 configured to identify a category of the main board M, a model identifying circuit 64 configured to identify a model of the MFD 1, an AD converter 66 connected to the model identifying circuit 64 and converts a voltage value output by the model identifying circuit 64 to a digital signal, and an ASIC (Application Specific Integrated Circuit) 52.

The ROM 14 stores a function table memory 14a and a substitute model memory 14b. The function table memory 14a stores a function table indicating proper combinations of a main board M and a panel board P connected to the main board M in the MFD 1, for each model of the MFD 1. Specifically, in the MFD 1 according to the first embodiment, a function table corresponding to the model of the MFD 1 from among the function information stored in the function table memory 14a is obtained based on hardware information of the main board M and the panel board P. As a result, even if a common program is used for the variety of models, it is possible to make respective units (i.e., the operation unit 34, LCD 36 and speaker unit 38) of the operation panel CP operate properly. The function table stored in the function table memory 14a will be described in detail with reference to FIG. 4.

The substitute model memory 14b is a memory storing substitute models, which can be used if the model cannot be identified based on the hardware information of the main board M and panel board P. The substitute model memory 14b stores, as the substitute models, the model having the maximum production is stored. As will be described later with reference to FIG. 7, when the model cannot be identified based on the hardware information regarding the main board M and the panel board P, by using the configuration of the model having the maximum production stored in the substitute model memory 14b, at least the basic functions of the operation panel CP can be used. In another case, if the operation panel CP is identified based on the hardware information regarding the panel board P but the main board M cannot be identified, a model having the maximum production is selected from among the models corresponding to the identified operation panel CP with reference to the substitute model memory 14b, a possibility that the basic functions would not work can be reduced. It should be noted that, if the basic functions can be used, a re-setting operation thereafter can be performed relatively easily.

The scanner unit 22, which is controlled by the main board M, scans an original set at a predetermined scanning position (not shown) to capture an image of the original and generates image data representing the captured image under control by the CPU 12. The scanner unit 22 is provided with an original feeding motor (not shown).

The printer unit 24 includes an inkjet printer that prints out images on a recording sheet set at a predetermined sheet feed position (not shown) under control of the CPU 12. The printer unit 24 includes a sheet feeding motor (not shown), a print head (not shown) ejecting ink drops to the recording sheet, and a carriage motor (not shown) that moves a carriage (not shown) mounting the print head.

The modem 26 modulates, under control of the CPU 12, the image data generated by the scanner unit 22 to generates image signal which can be transmitted to the telephone line network 100 via the line control unit 28, and also demodulates the image signal received from the telephone line network 100 via the network control unit 28 to generate the image data.

The network control unit 28 receives/transmits various signals from/to the telephone line 100. Further, the network control unit 28 sets, under control of the CPU 12, the transmission path which serves as destination/origin of the signals received from/transmitted to the telephone line 100.

As the transmission path, a path directed to the modem 26 is set, when the operation unit 34 is operated to transmit the image (i.e., facsimile data) or when the image signal (i.e., facsimile data) is received from the telephone line 100.

The transmission path set as above is released when the output of the image signal by the modem 26 has been completed, or when the reception of the image signal from the telephone line network 100 has been completed, and thereafter, the image signal cannot be transmitted through the transmission path.

The main board category identifying circuit 62 includes, at least, a DC (direct current) power source unit (not shown), a first resistance unit (not shown) provided between the DC power source unit and a port A 12a provided to the CPU 12, a second resistance unit (not shown) provided between the DC power source unit and a port B 12b provided to the CPU 12, and an earth unit (not shown). Depending on a structure of the circuit, to each of the port A 12a and port B 12b, the output signal is set to ON (High level) or OFF (Low level). The setting of the output signal (ON/OFF) is determined when the main board M is manufactured. According to the first embodiment, as will be described with reference to FIGS. 5A-5C, a combination of the output signals to the port A 12a and port B 12b is determined in accordance with the category (one of four categories) of the main board M (one of M1-M4).

The model identifying circuit 64 is configured such that voltages intrinsic to respective models are output. The model identifying circuit 64 includes a DC power source unit (not shown), an earth unit (not shown), a fixed resistance unit (not shown) and a variable resistance unit (not shown) which are provided, in series, between the earth unit and the DC power source unit, and a voltage is output to the AD converter 66 from a point between the fixed resistance unit and the variable resistance unit. The voltage output to the AD converter 66 can be adjusted by changing a resistance value of the variable resistance unit, and the resistance value is set for each model. Since the voltage value intrinsic to each model is output to the AD converter 66, the model of the MFD 1 can be identified by reading the AD value of the voltage input to the AD converter 66.

As shown in FIG. 1, the CPU 12, the ROM 14, the RAM 16, the EEPROM 18, the AD converter 66, the ASIC 52, and the modem 26 are interconnected through a main bus 54.

The main board category identifying circuit 62 is connected the two port, the port A 12a, and the port B 12b provided to the CPU 12.

The ASIC 52 is connected with the scanner unit 22, printer unit 24, a parallel I/F 40 which interfaces an external printer via a parallel cable, a USB I/F 42 through which a personal computer, a digital camera and the like can be connected, a LAN I/F 44 through which the MFD 1 can be connected to the LAN via a LAN cable, a panel I/F 46 which is an interface used for connection with the panel board P, and the network control unit 28 which is connected to the telephone line 100. Further, the network control unit 28 and the modem 26 are connected through the transmission path describe above.

The panel board P is connected to the main board M via the panel I/F 46. The panel board P is a board that controls the operation panel CP having the operation unit 34, LCD 36 and the speaker unit 38, in accordance with commands issued by the main board M. The panel board P is categorized corresponding to the category of the operation panel CP (e.g., a group of the operation panels CP having the one-line indication LCD 36, a group of the operation panels CP having the two-line indication LCD 36). As will be described later with reference to FIG. 6, for the panel P, there are four categories of panels P1-P4. In FIG. 1, the panel board P1 is shown.

As shown in FIG. 1, the panel board P includes a CPU 112 that controls the operation of respective parts (e.g., operation unit 34, LCD 36 and speaker unit 38) of the operation panel CP, a ROM 114 storing programs executed by the CPU 112 and fixed value data, a RAM 112 temporarily storing data/programs for procedures executed by the CPU 112, a panel board category identifying circuit 162 that identifies the category of the panel board P, a panel identifying circuit 164 that identifies the model of the operation panel CP, an AD converter 166 that carries out an AD (analog-to-digital) conversion to the voltage value output by the panel identifying circuit 164, and an input/output port 142.

The ROM 114 includes a function table memory 114a. The function table memory 114a is configured to store a function table similar to the function table stored in the function table memory 14a of the main board M. Thus, the function table stored in the function table memory 114a contains functional information that is necessary to make a combination of the main board M with a panel board P function properly, for each model of the MFD 1. When the function table 114*a* conforms with the model of the MFD 1, each part of the CP (i.e., the operation unit 34, LCD 36 and speaker unit 38), which is controlled by the panel board P operates correctly.

The operation unit 34 controlled by the panel board P includes a plurality of input keys (e.g., buttons and switches) to execute various functions of the MFD 1. The LCD 36 displays various pieces of information regarding the operation of the MFD 1. The speaker unit 38 includes a speaker and a driving circuit for the speaker.

The panel board category identifying circuit 162 includes, at least, a DC power source unit (not shown), a third resistance unit (not shown) provided between the DC power source unit 112 and a port C 112*a* provided to the CPU 112, a fourth resistance unit (not shown) provided between the DC power source unit and a port D 112*b* provided to the CPU 112, and an earth unit (not shown). Depending on the configuration of the wiring among the ports, the output signals to the port C 112*a* and port D 112*b* of the panel board category identifying circuit 162 are set to ON (High) level or OFF (Low) level. The ON/OFF setting of the output signals to the port C 112*a* and port D 112*d* is determined when the panel board P is manufactured. According to the first embodiment, as will be described later with reference to FIG. 6, in accordance with the four categories in the panel board P (i.e., panel boards P1-P4), predetermined combinations of ON/OFF signals are applied to the port C 112*a* and port D 112*b*, respectively. That is, four different combinations of ON/OFF signals applied to the ports C and D 112*a*, 112*b* correspond to the four categories P1-P4, respectively.

The panel identifying circuit 164 is configured such that specific voltages corresponding to models of the operation panel CP are output. The panel identifying circuit 164 includes, at least, a DC power source unit (not shown), an earth unit (not shown), and a fixed resistance unit (not shown) and a variable resistance unit (not shown) provided, in series, between the earth unit and the DC power source unit. At a point between the fixed resistance and the variable resistance, a voltage value is output to the AD converter 166. The voltage output to the AD converter 166 can be adjusted by changing the value of the variable resistance, and the voltage value is set for each model of the operation panel CP. Since different voltages are output the AD converter for respective models of operation panels CP, it becomes possible to determine the model of the operation panel CP based on the AD value of the voltage.

As shown in FIG. 1, the CPU 112, the ROM 114, the RAM 116, the AD converter 166 are connected to the input/output port 142, to which the operation unit 34, the LCD 36, the speaker unit 38 and the panel I/F 46 are also connected.

FIG. 2 shows a block diagram of the MFD 1 in which a main board M2 is employed as the main board M. The MFD 1 shown in FIG. 2 (i.e., the main board M1) has circuits realizing a cordless function.

As shown in FIG. 2, the main board M2 includes a main body I/F 48, which is connected to the ASIC 52, in addition to the configuration of the MFD 1 shown in FIG. 1. The main body I/F 48 is an interface to which a base main body board 50 provided with an antenna 50*a* is connected. By use of the antenna 50*a*, a wireless communication with an external cordless (wireless) handset (not shown) is realized. It should be noted that, in FIG. 2, the configuration of the panel board P is omitted for brevity, and it may have the structure similar to that shown in FIG. 1.

Since the main board M2 shown in FIG. 2 and the main board M1 shown in FIG. 1 are of different categories, it is possible to identify the category based on the combination of the ON/OFF states of the signals output from the main board category identifying circuit 62 to the port A 12*a* and port B 12*b* of the CPU 12.

Next, with reference to FIGS. 3A and 3B, the operation panel CP of the MFD 1 will be described in detail. FIGS. 3A and 3B are plan views of operation panels of different models. FIG. 3A shows an operation panel CPa, and FIG. 3B shows an operation panel CPb.

As shown in FIGS. 3A and 3B, the operation panel CP (CPa or CPb) has a variety of keys 34*a*-34*g* constituting the operation unit 34, and the LCD 36. As mentioned above, the speaker unit 38 is also included in the operation panel CP (CPa or CPb), however, in FIGS. 3A and 3B, it is omitted for brevity.

According to the first embodiment, the input key 34*a* is a power button. If the key 34*a* is depressed when the MFD 1 is powered OFF, the power is supplied to the MFD 1, while if the key 34*a* is depressed when the MFD 1 is powered ON, the MFD 1 is powered OFF.

The input key 34*b* is an arrow key and also functions as a menu set key, which enables a user to select a function or a setting value from among a list displayed on the LCD 36.

The input key 34*c* is a mode selection key with which the user can select one of the operable functions (e.g., a facsimile function, a copier function, a scanner function, a media print function, etc.).

The input keys 34*d* are ten keys, which are used to input a telephone number of a destination station when the MFD 1 operates in the FAX mode and/or to input setting values.

The input keys 34*e* are setting buttons, which are pressed to instruct specific functions in respective operation modes (e.g., the on-hook dialing function in the FAX mode).

The input key 34*f* is a stop button that instructs the system to stop a current operation if the button is depressed during the operation in one of respective operation modes.

The input keys 34*g* are start buttons, which are operated to start the operation of each function in the FAX mode and COPY mode.

The LCD 36 displays a variety of pieces of information related to the MFD 1. On the LCD 36, setting values are displayed when various setting in a function setting operation is performed. Further, when the MFD 1 is in a standby state, current settings may be displayed on the LCD 36 as standby information.

As shown in FIGS. 3A and 3B, the operation panels CPa and CPb are different in arrangement of the input keys 34*a*-34*g*, and have different types of LCD 36.

Specifically, as shown in FIG. 3A, the operation panel CPa is configured such that the input key 34*a* is provided on the right-hand side end portion of the operation panel CPa, and the input key 34*b* is arranged on the left-hand side of the input key 34*a*. The input keys 34*g* are arranged below the input key 34*b* in FIG. 3A, and the input key 34*f* is located on the left-hand side of the input keys 34*g*.

At a lower central portion, in FIG. 3A, of the operation panel CPa, the input key 34*c* enabling selection of four modes. On the left-hand side of the input key 34*c* and the LCD 36 located above the input key 34*c*, the input keys 34*d* are arranged. On the left-hand side of the input keys 34*d*, input keys 34*e* are arranged. The LCD 36 on the operation panel CPa is a single-line display type LCD.

The operation panel CPb is configured such that the input keys 34*g* are provided on the right-hand side end portion of the operation panel CPb. Above the input keys 34*g*, in FIG. 3B, the input key 34*f* is provided. On the left-hand side of the input keys 34*g*, the input key 34*b* is provided, and below the input key 34*b*, in FIG. 3B, part of input keys 34*e* are provided.

At a lower central portion of the operation panel CPb, the input keys 34c for selecting three modes are arranged. On the left-hand side of the input keys 34c and the LCD 36 located above the input keys 34c, the input keys 34d are arranged. On the left-hand side of the input keys 34d, the remaining part of the input keys 34e are provided, and above the input keys 34e, the input key 34a is provided. The LCD 36 of the operation panel CPb is a two-line display type LCD.

As described above referring to the operation panels CPa and CPb, for different operation panels CP, arrangement of the input keys 34a-34g and/or display of the LCD 36 are different. In order that the program for controlling the entire operation of the MFD 1 correctly recognize the type of the operation panel CP, according to the first embodiment, a function table corresponding to the type of the CP (or function model) is retrieved from the function table memories 14a and 114a, as will be described with reference to flowcharts shown in FIGS. 7-9.

Now, the function table will be described in detail. FIG. 4 schematically shows an example of a function table stored in the function table memories 14b and 114b. By a specific combination of the panel board P controlling the operation panel CP and the main board M, a model of the MFD 1 is determined. For each model, one function table is defined. As shown in FIG. 4, the function table stores settings of the key matrix, the number of lines of the LCD and the like, which are the settings for enabling the operation panel CP corresponding to the function table to function correctly.

The function table is selected corresponding to a model, which is determined in the main procedure, which is shown in FIG. 7, executed by the main board M. As a result, the function table corresponding to the operation panel CP suitable for the model of the MFD 1 is selected, even if the MFD 1 has a variety of models, the common control program can be used, and the operation panel CP functions properly.

Next, referring to FIGS. 5A-5C, identification of categories of the main board M and identification of models of the MFD 1 will be described. FIG. 5A shows a relationship between the combination of outputs of the main board category identifying circuit 62 and types of main board M (i.e., main boards M1-M4). As shown in FIG. 5A, the main board M1, which is the main board M of a first category (see FIG. 1), is configured such that the main board category identifying circuit 62 outputs signals representing OFF and OFF to the port A 12a and port B 12b of the CPU 12, respectively. Therefore, in the procedure shown in FIG. 7, if the OFF and OFF states are detected at the port A 12a and port B 12b, the category of the main board M is determined to be the main board M1 (see FIG. 1).

Similarly, if ON and OFF states are detected at the port A 12a and port B 12b of the CPU 12, the category of the main board M is determined to be the main board M2 (see FIG. 2). If OFF and ON states are detected at the port A 12a and port B 12b of the CPU 12, the category of the main board M is determined to be the main board M3. If ON and ON states are detected at the port A 12a and port B 12b of the CPU 12, the category of the main board M is determined to be the main board M4. As above, and as indicate in FIG. 5A based on the combination of the ON/OFF states of the two ports 12a and 12b connected to the main board category identifying circuit 62, the category of the main board (i.e., one of the main board M1 through main board M4) is identified.

FIG. 5B shows a relationship between the main boards M1-M4 of the four categories, which are identified based on the output signals of the main board category identifying circuit 62, AD converted values of the voltage output by the model identifying circuit 64, and models of the MFD 1. As shown in FIG. 5B, when the category of the main board M is determined based on the outputs of the main board category identifying circuit 62, then based on the AD converted value of the voltage output by the model identifying circuit 64, the model of the MFD 1 is identified.

In FIG. 5B, a range of the AD converted values of the voltages output by the model identifying circuit 64 is from 0 to 3FF. According to the first embodiment, the range from 0 to 3FF is divided in to 16 steps. Therefore, based on the states of the signals output by the main board category identifying circuit 62 and the AD value of the voltage output by the mode identifying circuit 64, 64 models (i.e., model 1 to model 64) can be identified. Since the AD value of the voltage output by the model identifying circuit 64 is used, the voltage output by the model identifying circuit 64 can be detected at a relatively high resolution. Accordingly, the identification of the model can also be made at high accuracy.

FIG. 5C shows a combination of the main board M and the operation panel CP (i.e., the panel board P) for each of the 16 models. For brevity, the combinations for models 16-64 are omitted. As shown in FIG. 5B, each of model 1 to model 16 employs the main board M1. Accordingly, as shown in FIG. 5C, in models 1-16, the main boards M1 and operation panel CP (i.e., panel board P) corresponding to the models 1-16 are coupled, respectively. For example, in model 6, the main board M1 is used as the main board M, and panel 18 is used as the operation panel CP. The panel 18 is, as is shown in FIG. 6B, a panel board P whose category is panel board P2, which will be described later.

Next, referring to FIGS. 6A and 6B, identification of the category of the panel board P and identification of the model of the MFD 1 will be described. FIG. 6A shows a relationship between four categories (panel boards P1-P4) of the panel board P and outputs of the panel board category identifying circuit 162. As shown in FIG. 6A, when the panel board P is the first category panel board P1 (see FIG. 1), the panel board category identifying circuit 162 outputs OFF signals to port C 112a and port D 112b of the CPU 112. Therefore, as illustrated in a flowchart shown in FIG. 9, when the OFF states are detected at port C 112a and port D 112b, the category of the panel board P is identified as the panel board P1 (see FIG. 1).

Similarly, when the ON and OFF states are detected at port C 112a and port D 112b, respectively, the category of the panel board P is determined as the panel board P2 (not shown). When the OFF and ON states are detected at port C 112a and port D 112b, respectively, the category of the panel board P is determined as the panel board P3 (not shown). When the ON and ON states are detected at port C 112a and port D 112b, respectively, the category of the panel board P is determined as the panel board P4 (not shown).

As shown in FIG. 6A, in accordance with the ON/OFF states of the two ports 112a and 112b, which are connected to the panel board category identifying circuit 162, the four categories of the panel board P (i.e., panel boards P1-P4) can be distinguished.

FIG. 6A shows a relationship between the four categories of the panel board P (i.e., panel boards P1-P4) identified based on the states of the output signals of the panel board category identifying circuit 162, the AD converted values of the voltages output by the panel identifying circuit 164, and the operation panels PC of the MFD 1. As shown in FIG. 6B, when the category of the panel board P (i.e., panel boards P1-P4) is identified based on the states of the signals output by the panel board category identifying circuit 162, the model of the operation panel determined based on the AC value output by the panel identifying circuit 164.

The range of the AD converted values of the voltages output by the panel identifying circuit 164 is from 0 to 3FF, and in this embodiment, the range is divided into 16 steps. Therefore, in the embodiment, based on the states of the output signals of the panel board category identifying circuit 162, and AD converted value of the voltage output by the panel identifying circuit 164, 64 models of operation panels PC (i.e., panel 1-panel 64) can be distinguished. Further, by referring to the AD converted values of the voltage output by the panel identifying circuit 164, the voltage output by the panel identifying circuit 164, the voltage output by the panel identifying circuit 164 can be detected at a high resolution, thereby identifying the model of the operation panel CP with a high accuracy.

Next, referring to flowcharts, selection of the function table corresponding to the functional model, and setting of the function table corresponding to the selected functional model will be described.

FIG. 7 is a flowchart illustrating a main procedure executed on the main board M of the MFD 1 according to the first embodiment. The main procedure starts when the MFD 1 is powered ON as the input key 34a is operated. The procedure shown in FIG. 7 is stored as a part of programs in the ROM 14.

In the main procedure, control detects the ON/OFF states of the port A 12a and port B 12b, and identifies the category of the main board M (S1). Then, control reads the value output by the AD converted 66 (S2). In S3, control judges whether the model is identified based on the category of the main board M identified in S1 and the AD value obtained in S2. If the model is identified (S3:YES), control sets the model of the MFD 1 as the identified model (S4).

If the AD value obtained in S2 is indefinite and the model is not identified (S3: NO), control sets the mode of the MFD 1 as a model that has the largest production number, which is stored in the substitution model memory 14b (S5).

After execution of S4 or S5, control transmits the operation panel model identifying signal and model information indicative of the identified model to the panel board P (S6), and judges whether information indicating the model of the operation panel CP (hereinafter, referred to as operation panel model information) is input through the panel board P (S7).

In S6, control transmits an operation panel model identification instructing signal is transmitted to the panel board P. As a result, in the panel board P, an operation panel model identifying procedure (FIG. 9), which will be described later, is executed. In the procedure, the model of the operation panel CP is identified, and operation panel model information related to the identified operation panel CP is transmitted to the main board M.

In S7, control judges whether the operation panel model information is received. If the operation panel model information has not been received from the panel board P (S7: NO), control waits for the reception of the operation panel model information from the panel board P. If the operation panel model information is received (S7: YES), control judges whether the model of the MFD 1 identified in S4 or S5 corresponds to the operation panel CP indicated by the operation panel model information received form the panel board P (S8). For example, if the model identified in S4 or S5 is the model 8, and the operation panel CP indicated by the operation pane model information is the panel 51, control determines that both correspond to each other (see FIG. 5C).

If the model of the MFD 1 identified in S4 or S5 corresponds to the operation panel CP indicated by the operation panel model information (S8: YES), control selects the function table corresponding to the identified model of the MFD 1 from the function table memory 14a (S9), and carries out the initialization in accordance with the selected function table (S10). After execution of S10, control transmits function table information indicative of the selected function table to the panel board P (S11), and then the main board M operates in a standby state.

If the model of the MFD 1 identified in S4 or S5 does not correspond to the operation panel CP indicated by the operation panel model information (S8: NO), control transmits an error signal to the panel board P (S12), and finishes the main procedure. As a result of execution of S12, an error procedure is executed by the panel board P (see FIG. 8), and an error state is notified through the LCD 36 and/or speaker unit 38 of the operation panel CP.

Thus, if the model of the MFD 1 identified in S4 or S5 does not correspond to the operation panel CP indicated by the operation panel model information which is received from the panel board P, the user is notified of the occurrence of the error condition. Accordingly, the user can deal with the error condition immediately by re-setting the main board M and/or the panel board P, or ask a manufacture of the MFD 1 to fix the error condition.

Next, with reference to FIG. 8, a procedure to be executed when the panel board P receives a signal from the main board through the panel I/F 46 will be described. It should be noted that the procedure illustrated in FIG. 8 is stored in the ROM 114 as a part of a control program.

FIG. 8 shows a flowchart illustrating a reception procedure to be executed by the panel board P. The reception procedure is started when the panel board P receives a signal or information from the main board M.

In S21, control identifies what is represented by the signal or information received from the main board M. If the signal or information received from the main board M is the operation panel model identification instructing signal and model information, which are received as a result of execution of S6 at the main board, control proceeds to S22. In this case, control executes the operation panel model identifying procedure, which will be described later, to identify the model of the operation panel CP. Then, control finishes the reception procedure.

If the signal or information received from the main board M represents the function table type information, which is received as a result of execution of S11 by the main board, control selects, in accordance with the received function table information, a function table corresponding to the model identified in the main procedure (see FIG. 7) executed by the main board M from the function table memory 114a (S23), and carries out the initial setting of the operation panel CP in accordance with the thus selected function table (S24). For example, in S24, a key matrix corresponding to the arrangement of the operation unit 34 of the operation panel CP in accordance with the key matrix setting of the function table, and in accordance with the setting of the line number of the LCD, a display setting of the LCD 36 is carried out. After execution of S24, control finishes the reception procedure.

If the signal or information received from the main board M is the error signal which is received as a result of execution of S12 by the main board M (S21: ERROR SIGNAL), an error notifying operation such as an error display on the LCD 36, an alarm by the speaker unit 38 to notify the user of the error condition is executed (S25).

If the model of the MFD 1 identified in the main procedure by the main board M does not correspond to the model of the operation panel CP identified in the panel model identifying procedure (see FIG. 9), in S25, the user is notified of the occurrence of the error condition. Therefore, the user can recognize that the MFD 1 would not operate correctly as a result of the malfunction of the combination of the main board M and the panel board P. Accordingly, the user can deal with the error condition immediately, by re-setting the combination of the main board M and the panel board P, or asking the manufacture to fix the error condition of the MFD 1. After execution of S25, control finishes the reception procedure.

If the signal or information received from the main board M is other signal or information (S21: OTHERS), for example, an error signal other than the error signal transmitted by the main board M as a result of execution of S12, control carries out a procedure corresponding to the received signal or information (S26) and finishes the reception procedure.

Next, referring to FIG. 9, the panel model identifying procedure, which is executed in S22 of FIG. 8, will be described. In the panel model identifying procedure, control detects the ON/OFF states of the port C 112a and port D 112b to identify the category of the panel board P (S41) then, in S42, control obtains the value output by the AD converter 166. After execution of S42, control judges whether a model of the operation panel CP can be identified based on the category of the panel board P identified in S41 and the AD converted value obtained in S42 (S43). If the model of the operation panel CP can be identified (S43: YES), control sets the model of the operation panel CP to the mode thereof identified from the category of the panel board P identified in S41 and the AD converted value obtained in S42 (S44).

If the model of the operation panel CP is not identified since the AD converted value obtained in S42 is indefinite (S43: NO), control sets the model of the operation panel CP corresponding to the model of the MFD 1 input to the panel board P as a result of execution of S6 in the main procedure executed by the main board M as the model of the operation panel CP (S45).

After execution of S44 or S45, control transmits the model of the operation panel CP identified in S44 or S45 to the main board M (S46). Then, by the main board M, S8 of the main procedure (see FIG. 7) is executed. After execution of S46, control finishes the panel model identifying operation.

Second Embodiment

Next, with reference to FIGS. 10 and 11, setting of the function table according to a second embodiment will be described. In the first embodiment described above, if the model of the MFD 1 is not identified after execution of S1 and S1, the model having the largest production number is used as a substitute model. In the second embodiment, even if the model of the MFD 1 is not identified after S1 and S2, if the model of the operation panel CP is identified, the model of the MFD 1 is identified based on the identified model of the operation panel CP.

In the following description, parts and steps same as those of the first embodiment will be indicated by the same reference/step numbers, and description thereof will be omitted for brevity. Further, in the second embodiment, the reception procedure executed by the panel board P is the same as that of the first embodiment (FIG. 8), where the description thereof will be omitted.

In the substitute model memory 14b according to the second embodiment, as the substitute model, one having the largest production number among the models corresponding to each model of the operation panels CP is stored as well as the model having the largest production number of all the models.

FIG. 10 shows a flowchart of the main procedure executed by the main board M, according to the second embodiment. The procedure shown in FIG. 10 is stored as a part of programs executed by the main board M and stored in the ROM 14.

In the main procedure shown in FIG. 10, steps S1-S3 are executed, which are similar to those of the first embodiment. If, in S3, the model of the MFD 1 is identified (S3: YES), S4 and S6 are executed similarly to the first embodiment. If the model is not identified (S3: NO), control skips S4, and proceeds to S6.

If the operation panel information is received from the panel board P (S7: YES), control judges whether the model of the MFD 1 has been identified (S61). If the model has been identified (S61: YES), control proceeds to S64. If the model has not been identified (S61: NO), control judges whether the model of the operation panel CP is identified in the panel model information received from the panel board P (S62).

If the model of the operation panel CP has been identified (S62: YES), control refers to the substitute model memory 14b, and sets the model of the MFD 1 as the model of the MFD having the largest production number among the model corresponding to the identified operation panel CP (S63). After execution of S63, control proceeds to S64. As S63 is executed, even if the model of the MFD 1 has not been identified in S3, if the operation panel CP is identified in the panel model identifying procedure (FIG. 11), which will be described later, the model of the MFD 1 can be identified based on the identified operation panel CP. In this case, among the models corresponding to the operation panel CP, the model having the largest production number is set as the model of the MFD 1, possibility that the basic functions do not work at all can be reduced. If at least the basic functions are available, re-setting thereafter can be carried out relatively easily.

If the model of the operation panel CP has not been identified (S62: NO), control skips S63, and proceeds to S64. In this case, control proceeds with the model of the MFD 1 and the model of the operation panel CP being unidentified.

In S64, control judges whether both the model of the MFD 1 and model of the operation panel CP have been identified. If both the model of the MFD 1 and model of the operation panel CP have been identified (S64: YES), control judges whether the operation panel CP corresponding to the model of the MFD 1 identified in S4 or S63 corresponds to the operation panel CP indicated by the operation panel information received from the panel board P (S65).

If the operation panel CP corresponding to the model of the MFD 1 identified in S4 or S63 corresponds to the operation panel CP represented by the operation panel information input from the panel board P, control executes S9-S11 similarly to the first embodiment, and proceeds to operate in the standby state.

If at lest one of the model of the MFD 1 and the model of the operation panel CP is not identified (S64: NO), control sets the model having the largest production number stored in the substitute model memory 14b as the model of the MFD 1 (S66), and proceeds to S9. Since the model having the largest production number is set as the model of the MFD 1 if at least one of the model of the MFD 1 or the model of the operation panel CP, a possibility that the basic functions do not work can be reduced. If the basic functions are available, a troublesome re-setting work can be made easier.

If the operation panel CP corresponding to the model of the MFD 1 identified in S4 or S63 does not correspond to the operation panel CP represented by the operation panel model information received from the panel board P (S65: NO), control executes S9 similarly to the first embodiment, and finishes the main procedure.

FIG. 11 shows a flowchart illustrating a panel model identifying procedure executed by the panel board P according to the second embodiment. The procedure is stored as a part of control program executed by the panel board P and stored in the ROM 114.

In the panel model identifying procedure according to the second embodiment, similarly to the first embodiment, S41-S43 are executed.

If the operation panel CP is identified (S43: YES), similarly to the first embodiment, S44 and S46 are executed, and control finishes the panel model identifying procedure according to the second embodiment.

If the operation panel CP is not identified (S43: NO), control judges whether the model of the MFD 1 is identified in the model information which is input together with the operation panel model identification instruction from the main board M (S81). If the model of the MFD 1 has been identified (S81: YES), control sets the model of the operation panel CP to the operation panel CP corresponding to the model of the MFD 1 (S82). After execution of S82, control proceeds to S46.

If the model of the MFD 1 has not been identified (S81: NO), control skips S82 and proceeds to S46.

As described above, in the MFD 1 according to either the first embodiment or the second embodiment, if the operation panel CP corresponding to the model of the MFD which is identified based on the output signals of the main board category identifying circuit 62 and the AD converted value of the output of the model identifying circuit 66 corresponds to the operation panel CP which is identified based on the output states of the panel board category identifying circuit 162 and the AD converted value of the output of the panel identifying circuit 166, the function table corresponding to the identified model of the MFD 1 is obtained and set.

Therefore, it is possible to determine whether the main board M for controlling the entire operation of the MFD 1, and the panel board P for controlling the operation of the operation panel CP bases on the instruction by the main board M correspond accurately to each other. Therefore, malfunctions due to inadequate combination of the main board M and the panel board P can be prevented effectively.

In the MFD 1 described above, the main board M and the panel board P are identified based on the hardware configuration, and the function table enabling the operation panel CP to operate correctly is selected and set. According to such an MFD, a variety of models can be controlled with a single program, which suppresses the manufacturing cost of the variety of MFDs.

When the main board M and the panel board P are identified, the AD converted values of the voltages output by the model identifying circuit and the panel identifying circuit are referred to. Since the AD converted values are used, a lot of models of MFDs and operation panels can be distinguished from each other.

It should be noted that the above-described embodiments are illustrative ones, and the invention need not be limited to the configurations described above. Various modifications can be made without departing from the scope of the invention.

For example, in the above-described embodiments, the model of the MFD is identified based on the output state of the main board category identifying circuit 62 and the AD converted value of the voltage output by the model identifying circuit 66. On the other hand, the operation panel CP is identified based on the output states of the panel board category identifying circuit 162 and the AD converted value of the voltage output by the panel identifying circuit 164. Further, when the operation panel corresponding to the identified model of the MFD and the operation panel as identified coincide with each other, the function table corresponding to the identified model is retrieved and set.

Instead of the above configuration, it may be possible that the identification of the operation panel CP based on the output states of the panel board category identifying circuit 162 and the AD converted value of the voltage output by the panel identifying circuit 164 may be omitted, and a function table corresponding to the model of the MFD 1 identified in accordance with the output states of the main board category identifying circuit 62 and the AD value of the output by the model identifying circuit 64, and the thus obtained table may be set. In such a case, the panel board category identifying circuit 162 and the panel identifying circuit 164 may not be provided on the panel board P, which reduces the manufacturing cost.

In the above-described embodiments, the category of the main board M is determined based on the ON/OFF signals applied to the port A 12a and port B 12b from the main board category identifying circuit 62. This may be modified such that more than two signals respectively representing the ON/OFF state are applied from the main board category identifying circuit 62 to corresponding number of ports provided to the CPU 112. According to such a configuration, the number of distinguishable categories increases, and therefore, the number of identifiable models of the MFD 1 can be increased. Similarly, the panel board category identifying circuit 16 may be configured to output more than two ON/OFF signals and the CPU 112 may be configured to have the corresponding number of ports to detect more than two ON/OFF signals, respectively.

In the above-described illustrative embodiments, the CPU 112 of the panel board P identifies the model of the operation panel CP based on the outputs of the panel board category identifying circuit 162 and the panel identifying circuit 164. This configuration may be modified such that the outputs of the panel board category identifying circuit 162 and the panel identifying circuit 164 are input to predetermined ports of the CPU 12 of the main board M, and the operation panel CP may be identified while the main procedure of the main board M (see FIG. 7 or 10) is being executed.

In the above-described embodiments, referring to FIGS. 1 and 2, a part of the possible combinations of the main board M and the panel board P. The main board M need not be limited to the main board M1 (see FIG. 1) but one of main boards M2-M4 can also be used. The panel board P need not be limited to the panel board P1, but can be replaced with one of the panel boards P2-P4. The same applies to the configuration shown in FIG. 2.

In the second embodiment, even if the model of the MFD 1 cannot be identified based on the output signals of the main board category identifying circuit 62 and the output of the AD converter 66, if the model of the operation panel CP has been identified based on the operation panel information received from the panel board P, the model of the MFD 1 is identified based on the model of the operation panel as identified. That is, in such a case, steps S61-S63 of FIG. 10 are executed.

Instead of the above configuration, steps S61-S63 may be omitted and the model having the largest production number of all the MFDs may be selected as the model of the MFD 1 if neither the model of the MFD 1 nor the operation panel board has been identified.

Alternatively, in the second embodiment, S61-S63 may be omitted, and an error signal may be transmitted to the panel board P if neither the model of the MFD 1 nor the operation panel board has been identified.

What is claimed is:

1. A multi function device, comprising:
a main board configured to control functions corresponding to a model of the multi function device, one of the functions including a printing function;
a sub board configured to be connected with the main board, the sub board carrying out peripheral control corresponding to the model of the multi function device;
a function information storage configured to store function information enabling a combination of the main board and sub board corresponding to the model of the multi function device to function appropriately for each model of the multi function device;
a first circuit configured to output information to identify a type of the main board;
a second circuit configured to output a voltage corresponding to the main board;
a voltage reading system configured to read the voltage outputted by the second circuit as an analog-to-digital (A/D) value;
a model identifying system configured to identify the model of the multi function device based on the A/D value and the type of the main board identified, wherein the model identifying system identifies the model of the multi function device when the multi function device is powered on;
a panel board configured to send model identification information;
a judging unit configured to judge whether the model identified by the model identifying system coincides with the model identification information sent by the panel board, and further configured to transmit an error signal when the model identified by the model identifying system does not coincide with the model identification information sent by the panel board;
a function information obtaining system that obtains function information from the function information storage corresponding to the model identified by the model identifying system in response to the judging unit judging that the model identified by the model identifying system matches the model identification information received from the panel board; and
a function control system that controls the main board and the sub board of the identified model of the multi function device to correctly function based on the function information obtained by the function information obtaining system.

2. The multi function device according to claim 1, further comprising:
a sub-device which is controlled by the sub-board;
a sub board first identification information obtaining system configured to obtain sub board first identification information the sub board peculiarly includes;
a sub device identification system configured to identify the sub device based on the sub board first identification information obtained by the sub board first identification information obtaining system when the multi function device is powered on; and
a coincidence judging system configured to judge whether the sub device identified by the sub device identifying system coincides with the sub device of the identified model of the multi function device identified by the model identifying system,
wherein the function information obtaining system obtains the function information corresponding to the model identified by the model identifying system from the function information storing system if the coincidence judging system determines that the sub device identified by the sub device identifying system coincides with the sub device of the identified model of the multi function device identified by the model identifying system.

3. The multi function device according to claim 2,
wherein the sub board includes:
a sub device identifying circuit configured to output a voltage intrinsic to the sub device controlled by the sub board; and
a sub board voltage reading system configured to read an A/D (Analog to Digital) converted value of the voltage output by the sub device identifying circuit, and
wherein the sub board first identification information obtained by the sub board first identification information obtaining system includes the A/D (Analog to Digital) converted value of the voltage read by the sub board voltage reading system.

4. The multi function system according to claim 2,
further including a sub board second identification information obtaining system that obtains sub board second identification information that identifies a category of the sub board,
wherein the sub device identifying system identifies the sub device based on the sub board first identification information obtained by the sub board first identification information obtaining system and the sub board second identification information obtained by the sub board second identification information obtaining system when the multi function device is powered on.

5. The multi function device according to claim 2,
further including an error notifying system configured to notify an occurrence of an error when the sub device identified by the sub device identifying system and the sub device of the model identified by the model identifying system are determined to be different by the coincidence judging system.

6. The multi function device according to claim 2,
wherein the sub device includes:
a substitute model storing system configured to store a substitute model which is used as the model identified by the model identifying system when the sub device is identified by the sub device identifying system, and when the model cannot be identified based on the A/D value read by the voltage reading system and the type of main board identified by the first circuit; and
a model substituting system that uses the model stored in the substitute model storing system as the model identified by the model identification system when the model cannot be identified based on the A/D value read by the voltage reading system and the type of main board identified by the first circuit when the sub device is identified by the sub device identifying system.

7. The multi function device according to claim 1,
further comprising:
a substitute model storing system that stores a substitute model, which is used as the model identified by the model identifying system if the model cannot be identified by the model identifying system; and
a substituting system that sets the substitute model stored in the substitute model storing system as the model identified by the model identifying system if the model cannot be identified by the model identifying system.

8. The multi function device according to claim 7,
wherein the substitute model stored in the substitute model storing system is a model having the largest production number, and wherein, if the model identifying system cannot identify the model based on an indefinite A/D value read by the voltage reading system, the substituting system uses the model having the largest production number as the model identified by the model identifying system.

9. The multi function device according to claim 1, further comprising:
a sub device which is controlled by the sub board that is an operation panel through which operations corresponding to the model can be instructed, and
wherein the function information includes information regarding settings of the operation panel.

10. The multi function device according to claim 1, further comprising:
a sub device which is controlled by the sub board that is an operation panel including at least one of a displaying unit configured to display an indication corresponding to the model and a notifying unit configured to output notification corresponding to the model, and
wherein the function information includes setting information of the at least one of the displaying unit and the notifying unit.

11. A method of carrying out function setting for a multi function device including a main board configured to control functions corresponding to a model of the multi function device and a sub board configured to be connected with the main board, the sub board carrying out peripheral control corresponding to the model of the multi function device, one of the functions including a printing function, the main board including a model identifying circuit configured to output a voltage intrinsic to the model and a main board voltage reading system that reads an A/D (Analog to Digital) converted value of the voltage output by the model identifying circuit, the method comprising the steps of:
obtaining information indicative of a type of the main board;
obtaining the A/D converted value of the voltage;
identifying the model of the multi function device based on the information indicative of the type of the main board and the A/D converted value of the voltage when the multi function device is powered on;
judging whether the identified model coincides with information obtained from a panel board, the information obtained from the panel board including a model of the panel board;
transmitting an error signal in response to that the identified model does not coincide with the information obtained from the panel board;
obtaining function information from a function information storage corresponding to the identified model in response to judging that the identified model coincides with information obtained from the panel board;
controlling the main board and the sub board of the multi function device to correctly function based on the function information.

12. A computer-readable medium having a program stored thereon, the program comprising computer readable instructions that cause a computer to carry out function setting for a multi function device including a main board configured to control functions corresponding to a model of the multi function device and a sub board configured to be connected with the main board, the sub board carrying out peripheral control corresponding to the model of the multi function device, one of the functions including a printing function, the main board including a model identifying circuit configured to output a voltage intrinsic to the model and a main board voltage reading system that reads an A/D (Analog to Digital) converted value of the voltage output by the model identifying circuit, the program causing the computer to:
obtain information indicative of a type of the main board;
obtain the A/D converted value of the voltage;
identify the model of the multi function device based on the information indicative of the type of the main board and the main A/D converted value of the voltage when the multi function device is powered on;
judge whether the identified model coincides with information obtained from a panel board, the information obtained from the panel board including a model of the panel board;
transmitting an error signal in response to judging that the identified model does not coincide with the information obtained from the panel board;
obtain function information from a function information storage corresponding to the identified model in response to judging that the identified model coincides with information obtained from the panel board; and
control the main board and the sub board of the multi function device to correctly function based on the function information.

13. A system for carrying out function setting for a multi function device including a main board configured to control functions corresponding to a model of the multi function device and a sub board configured to be connected with the main board, the sub board carrying out peripheral control corresponding to the model of the multi function device, one of the functions including a printing function, the main board including a model identifying circuit configured to output a voltage intrinsic to the model and a main board voltage reading system that reads an A/D (Analog to Digital) converted value of the voltage output by the model identifying circuit, the system comprising:
means for obtaining information indicative of a type of the main board;
means for obtaining the A/D converted value of the voltage;
means for identifying the model of the multi function device based on the information indicative of the type of the main board and the A/D converted value of the voltage when the multi function device is powered on;
means for judging whether the identified model coincides with information obtained from a panel board, the information obtained from the panel board including a model of the panel board;
means for transmitting an error signal in response to judging means judging that the identified model does not coincide with the information obtained from the panel board;
means for obtaining function information from a function information storage corresponding to the identified model in response to judging means judging that the identified model coincides with information obtained from the panel board; and
means for controlling the main board and the sub board of the multi function device to correctly function based on the function information.

* * * * *

UNITED STATES PATENT AND TRADEMARK OFFICE
CERTIFICATE OF CORRECTION

PATENT NO.       : 7,694,028 B2                                         Page 1 of 1
APPLICATION NO.  : 11/188848
DATED            : April 6, 2010
INVENTOR(S)      : Daisuke Kasamatsu It is certified that error appears in the above-identified patent and that said Letters Patent is hereby corrected as shown below:

On the cover page, Item (54) and at Column 1, line 2, in the title:
      Please delete "Indentification" and insert --Identification--.

Signed and Sealed this

Twelfth Day of October, 2010

David J. Kappos
*Director of the United States Patent and Trademark Office*